US012018980B2

(12) United States Patent
Williams et al.

(10) Patent No.: US 12,018,980 B2
(45) Date of Patent: Jun. 25, 2024

(54) DYNAMIC SYSTEMS AND PROCESSES FOR DETERMINING A CONDITION THEREOF

(71) Applicant: Schlumberger Technology Corporation, Sugar Land, TX (US)

(72) Inventors: Michael John Williams, Ely (GB); Gary Martin Oddie, St. Neots (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 60 days.

(21) Appl. No.: 17/995,523

(22) PCT Filed: Apr. 20, 2021

(86) PCT No.: PCT/US2021/028062
§ 371 (c)(1),
(2) Date: Oct. 5, 2022

(87) PCT Pub. No.: WO2021/216486
PCT Pub. Date: Oct. 28, 2021

(65) Prior Publication Data
US 2023/0154080 A1 May 18, 2023

(51) Int. Cl.
G06F 18/22 (2023.01)
G01F 25/10 (2022.01)
G01H 9/00 (2006.01)
G06T 11/20 (2006.01)

(52) U.S. Cl.
CPC ............ *G01H 9/004* (2013.01); *G01F 25/10* (2022.01); *G06F 18/22* (2023.01); *G06T 11/206* (2013.01)

(58) Field of Classification Search
None
See application file for complete search history.

(56) References Cited

U.S. PATENT DOCUMENTS 11,494,618 B2 * 11/2022 Xia .................... G06N 3/045
2003/0063772 A1 * 4/2003 Smith .................. G07D 7/004
382/100

(Continued)

FOREIGN PATENT DOCUMENTS

KR 1020080098871 A 11/2008
KR 1020140093828 A 7/2014
WO 2016123705 A1 8/2016

OTHER PUBLICATIONS

Oddie, G.M., "Characterization of multicomponent (liquid) flows using scattered ultrasound", Appendix D—Chaos in Fluid Flows, PHD Thesis, Cranfield Institute of Technology, 1992, pp. 260-321.
Rawes W., "The application of signal analysis techniques based on chaos theory to flow regime identification", PhD Thesis, Cranfield University, 1996, 172 pages.

(Continued)

*Primary Examiner* — Joni Hsu
(74) *Attorney, Agent, or Firm* — Jeffrey D. Frantz

(57) ABSTRACT

A non-linear dynamic process such as multiphase flow is characterized to determine a condition of the process. A sensor may obtain information about strain, vibration, flow rate, etc. during the process. That sensor data may be plotted, and at least one perceptual hash can be generated from the plot. The perceptual hash can be compared against a database storing plots or hashes for non-linear dynamic responses for different sensor types or processes. A best fit hash may be identified and used to determine what conditions are occurring in the field, or multiple near fits can define an envelope of experimental/reference conditions with similar non-linear dynamics to the field system. Multiple hash comparisons may be used to refine the envelope, determine a best fit, or determine what measurement would help discriminate the flow conditions.

16 Claims, 14 Drawing Sheets

(56) References Cited

U.S. PATENT DOCUMENTS

| | | | |
|---|---|---|---|
| 2012/0136641 A1 | 5/2012 | Fung et al. | |
| 2013/0187930 A1 | 7/2013 | Millman | |
| 2014/0283144 A1* | 9/2014 | Gettings | G08B 23/00 |
| | | | 726/30 |
| 2016/0203374 A1* | 7/2016 | Zeng | G01S 13/726 |
| | | | 382/104 |
| 2017/0030798 A1* | 2/2017 | DeVerse | G01M 3/243 |
| 2019/0078155 A1* | 3/2019 | Gordon | G16B 99/00 |
| 2019/0358456 A1* | 11/2019 | Libbus | A61N 1/36139 |
| 2020/0080873 A1* | 3/2020 | Jackson | G06F 16/2255 |
| 2022/0126864 A1* | 4/2022 | Moustafa | B60W 30/182 |

OTHER PUBLICATIONS

Perceptual Hashing, https://en.wikipedia.org/wiki/Perceptual_hashing, downloaded on Oct. 3, 2022, 5 pages.

Franca et al., "The use of fractal techniques for flow regime identification", Int. J. Multiphase Flow, 17(4), 1991, pp. 545-552.

Huanqun et al., "Fractal characteristics of oil-gas-water multiphase flow", Journal of Thermal Science, 11(1), 2002, pp. 49-52.

Liong et al., "Deep hashing for compact binary codes learning", The IEEE Conference on Computer Vision and Pattern Recognition (CVPR), 2015, pp. 2475-2483.

Oddie et al., "Experimental study of two and three phase flows in large diameter inclined pipes" International Journal of Multiphase Flow, 29(45), 2003, pp. 527-558.

International Search and Written Opinion in International Patent Application No. PCT/US2021/028062, dated Aug. 6, 2022, 8 pages.

* cited by examiner

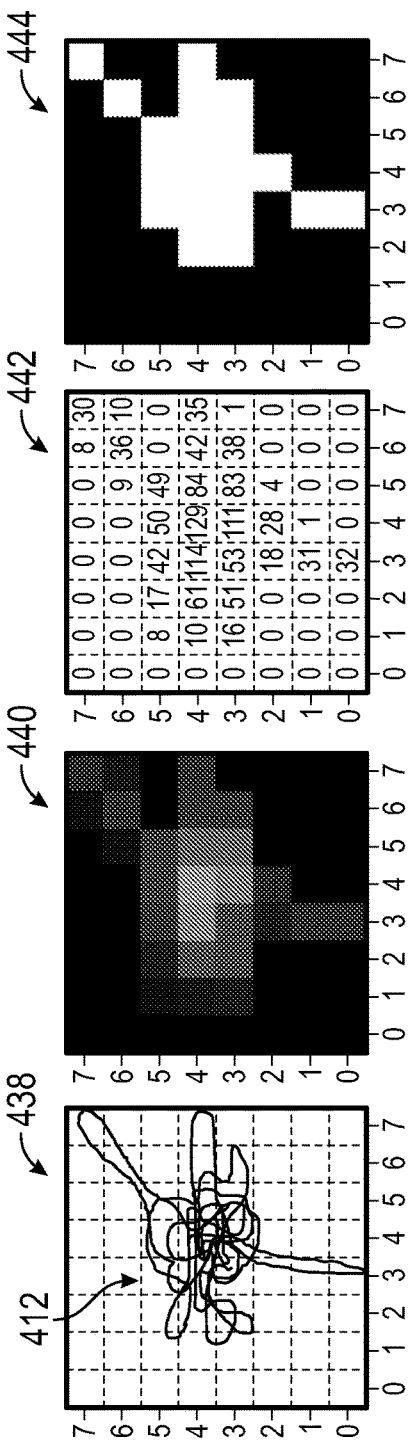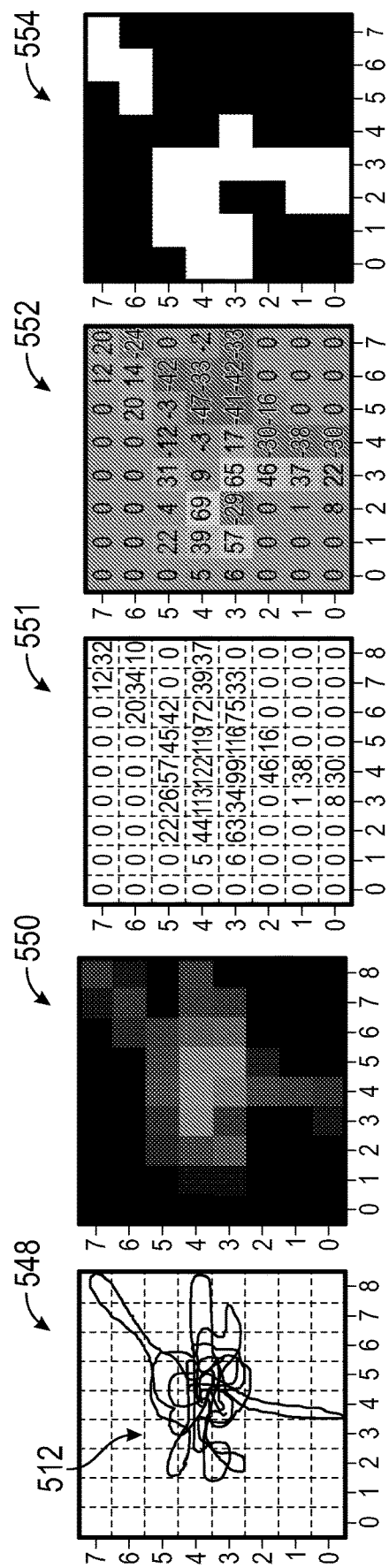
FIG. 4
FIG. 5

DYNAMIC SYSTEMS AND PROCESSES FOR DETERMINING A CONDITION THEREOF

CROSS-REFERENCE TO RELATED APPLICATIONS

This application is the National Stage Entry of International Application No. PCT/US2021/028062, filed Apr. 20, 2021, which claims the benefit of, and priority to, U.S. Patent Application No. 63/012,372, filed Apr. 20, 2020, and titled "Characterizing Non-Linear Dynamic Processes", which application is expressly incorporated herein by this reference in its entirety.

BACKGROUND

A flowing fluid may be considered to have a multiphase flow when the flow simultaneously includes more than one fluid phase. This may include a flow containing a liquid and a gas of the same composition, or the flow may contain a liquid and a gas of different composition. For instance, oil wells commonly produce hydrocarbon liquid oil, as well as hydrocarbon gasses. Additionally, the oil well may also produce water or flowing fluid may include drilling mud, production fluids, or the like. Multiphase flows may also occur in a pipeline.

While the behavior of single-phase flow is relatively simple to characterize, the behavior of multiphase flow is more complicated and highly non-linear in nature. The flow regime in multiphase flow can depend on many factors, including, for example, the types of different fluids, the densities and viscosities of the fluids, the flow speed, the orientation (e.g., incline angle) of the flow conduit, the temperature and pressure of the fluids, and whether solids are included in the multiphase flow.

SUMMARY

According to one aspect, a method for identifying a condition of a non-linear dynamic system includes using one or more sensors to obtain sensor data from a non-linear dynamic system. The sensor data is plotted, and one or more perceptual hashes are created from the plotted sensor data. The one or more perceptual hashes are compared to a set of reference perceptual hashes to identify one or more matching reference data sets. Information on the one or more matching reference data sets is then provided.

According to another aspect, a method for determining a condition of multiphase flow includes using one or more sensors to capture strain or vibration sensor data on a conduit for the multiphase flow. A plot for the captured sensor data is generated, and a plurality of field perceptual hashes are generated from the plot of the captured sensor data. A plurality of reference hash sets are accessed from a data store and correspond to a plurality of reference data sets. The plurality to field perceptual hashes are compared to the plurality of reference hash sets to identify at least one matching reference data set of the plurality of reference data sets.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIGS. 2-1 and 2-2 are examples of two-dimensional Poincaré plots that display dynamic behavior as a time series analysis, according to an embodiment of the present disclosure;

FIG. 4 is a visual representation of a manner of creating a perceptual, average hash, according to an embodiment of the present disclosure;

FIG. 5 is a visual representation of a manner of creating a perceptual, column difference hash, according to an embodiment of the present disclosure;

FIGS. 7-1 to 7-8 are schematic illustrations of different types of multiphase flow, according to an embodiment of the present disclosure;

FIG. 8-1 is a visual representation of a manner of creating a perceptual, average hash using an irregular grid, according to an embodiment of the present disclosure;

FIG. 8-2 is a visual representation of a manner of creating a perceptual, row difference hash using an irregular grid, according to an embodiment of the present disclosure;

FIGS. 9-1 to 9-4 are schematic illustrations of grid patterns for determining a perceptual hash, according to an embodiment of the present disclosure;

FIG. 10-1 is an illustration of the generation of a set of perceptual hashes of a field data set, according to an embodiment of the present disclosure;

FIG. 10-2 is an illustration of the generation of a set of perceptual hashes of a reference data set for comparison against the hashes of the field data set of FIG. 10-1, according to an embodiment of the present disclosure;

FIG. 11-1 is an illustration of the generation of a set of perceptual hashes of a field data set, according to another embodiment of the present disclosure;

FIG. 11-2 is an illustration of the generation of a set of perceptual hashes of a reference data set for comparison against the hashes of the field data set of FIG. 11-1, according to an embodiment of the present disclosure;

FIGS. 13-1 and 13-2 are illustrations of the generation of perceptual, average and row difference hashes, respectively, according to an embodiment of the present disclosure.

DETAILED DESCRIPTION

Some aspects of the present disclosure relate to methods, systems, and computer-readable media for characterizing non-linear dynamic processes. For example, an example type of non-linear dynamic process may include multiphase flow of fluids in a pipe or well, although aspects of the present disclosure have broader application to other non-linear systems. By way of illustration, other non-linear dynamic systems that may benefit from aspects of the present disclosure include self-balancing systems (e.g., bipedal robots, SEGWAY two-wheeled vehicles, self-stabilizing bicycle, etc.), power balancing in an electrical power system, biological processes (e.g., for health and disease diagnostics), among others.

Understanding what is happening in a non-linear dynamic process can be a significant factor in successful job completion. For instance, understanding the nature of multiphase flow in a pipeline may allow flow conditions to be changed or controlled to reduce pollution and erosion, to limit damage to system tools, and to improve product quality and process efficiency.

Figure 1:
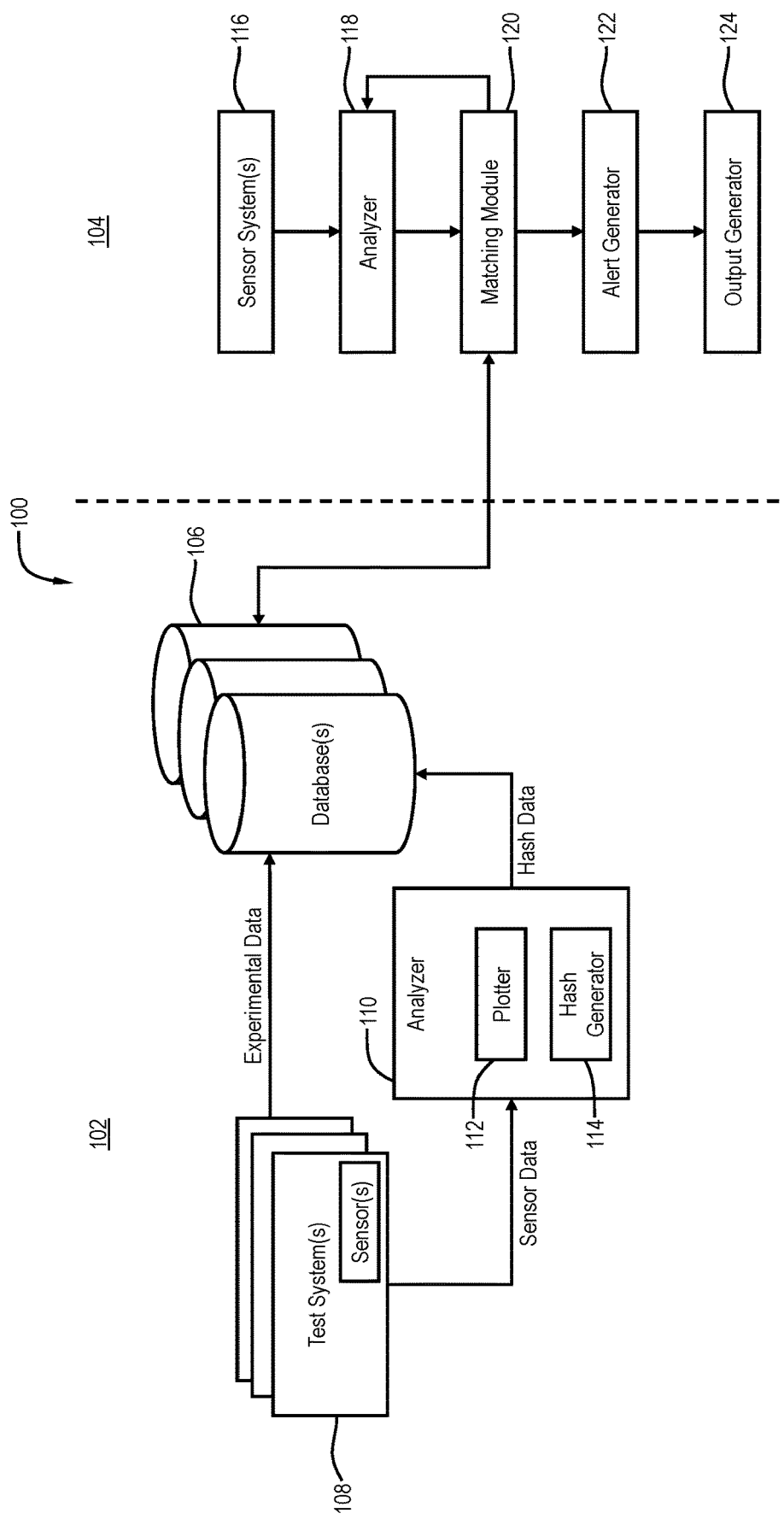
FIG. 1 is a schematic view of a system for characterizing the nature of non-linear dynamic processes, and includes a data generating system that generates reference data used by a field observation system to determine the nature of the non-linear dynamic process, according to an embodiment of the present disclosure.

Turning now to FIG. 1, an example system 100 for characterizing the nature of non-linear dynamic processes is illustrated. The system 100 is shown in schematic form, but the understanding of specific devices, components, and systems that are represented in the schematic illustration is within the skill of one in the art in view of the disclosure herein.

The system 100 is shown as including a data generating system 102, and a field observation system 104. In particular, the data generating system 102 may be used to generate and build a database 106 related to sensor data or other types of measurements across many different types of dynamic conditions. The field observation system 104 may use separate sensor data or measurements (e.g., field measurements, operational measurements, real-time measurements, etc.) and use the information in the database 106 generated by the field observation system 104 in order to characterize the newly obtained measurements. For simplicity, the system 100 is shown as including both an experimental portion that operates as a data generating system 102, as well as a field observation system 104. However, in practice, the data generating system 102 may be in a system that is separate from a system including the field observation system 104. Such separate systems may directly or indirectly communicate, or data generated by the data generating system 102 may be provided in bulk to the field observation system 104 for its independent use.

The data generating system 102 of the embodiment in FIG. 1 includes one or more test systems 108 used to generate and/or gather data from a dynamic process. The test systems 108 may include multiple systems, and can include one or more sensors or sensor systems. In one embodiment, for instance, the sensors of the test systems 108 include a distributed acoustic sensor. Distributed acoustic sensors (DAS) can use fiber optic cables to provide distributed strain sensing. In particular, the optical fiber becomes the sensing element and measurements are made and processed using an optoelectronic device. As a particular example, a Rayleigh scatter based DAS can send a coherent laser pulse along the optical fiber. Scattering sites within the fiber cause the fiber to act as a distributed interferometer, and the intensity of reflected light is measured as a function of time after transmission of the laser pulse. Of course, other types of sensors for measuring any combination of strain, load, temperature, pressure, vibration, angle, velocity, rotation, or other dynamic conditions, may be used in the same or other embodiments. Examples include EM sensors, Coriolis meters, proprietary sensors/meters, and the like.

In a particular example related to multiphase flow conditions, a test system 108 can include a flow loop. For instance, one or more flow loops may be used to evaluate multiphase flow under variable conditions by changing the fluid(s), by creating, measuring, and observing differing fluid flow conditions (e.g., temperature, incline, pressure, flow rate, flow mixing tools, etc.), by observing and capturing the how such flow conditions appear visually, and the like. Such flow loops may be used to evaluate both horizontal and vertical flow, as well as any angle of flow between vertical and horizontal, as well as how flow characteristics change when flow changes direction. A distributed acoustic sensor or other type of strain or vibration sensor (among other types of sensors) may be used in such a test system 108 to understand the strain oscillations on the flow conduit for each type of flow condition that is generated or observed.

Whatever the type of sensor data that is obtained, the sensor data may be provided to an analyzer 110 that receives and performs one or more types of interpretations or analyses of the received data. In one aspect, this may include plotting the data using a plotter 112 and generating a hash of the plotted data using a hash generator 114. In some embodiments, the plotter 112 may generate any type of plot. For example, the plotter 112 may generate a 2-dimensional (2-D) plot of the sensor data. In some examples, the plotter 112 may generate a 3-dimensional (3-D) plot of the sensor data. In some embodiments, the hash generator 114 may generate a hash of the entire 3-D plot. In some embodiments, the hash generator may generate a hash of one or more slices, or 2-D sections of the 3-D plot. In some embodiments, the plot generated by the plotter 112 may be non-dimensional. In some embodiments, the analyzer 110 may convert the sensor data to non-dimensional values. Plotting and creating hashes from non-dimensional sensor data may allow for consistent analysis of the hashed plots across multiple systems, sensor suites, computing systems, countries, unit conversions, and so forth.

Figures 1, 2:
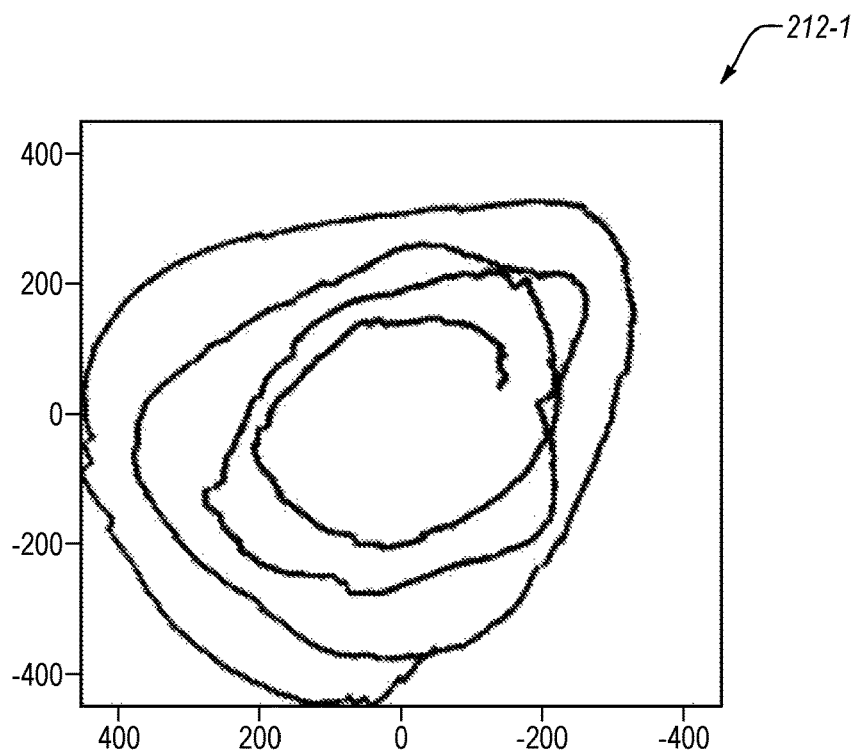
Figure 2:
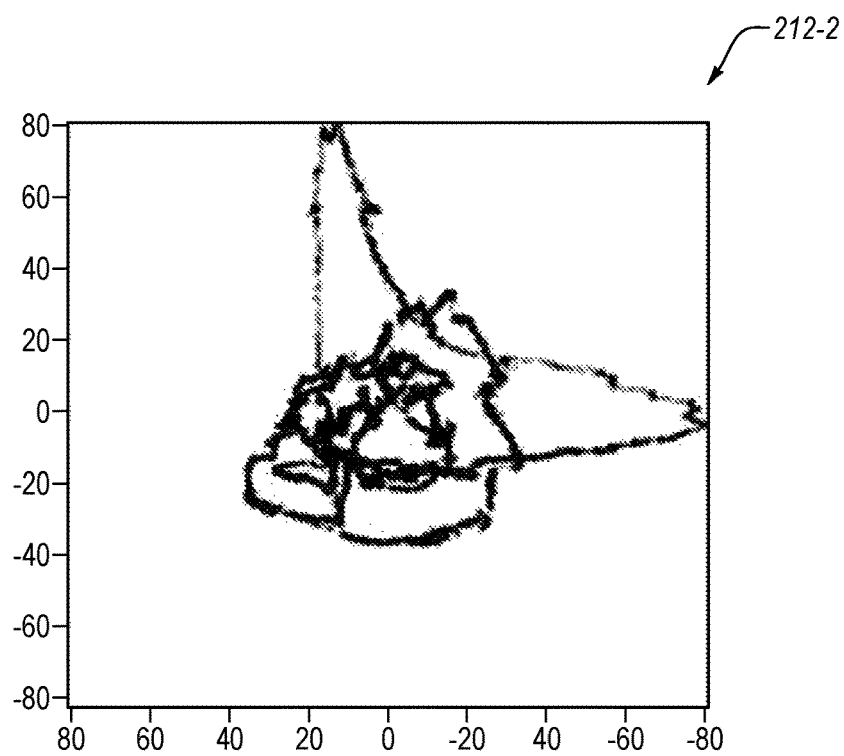
Figures 1, 13:
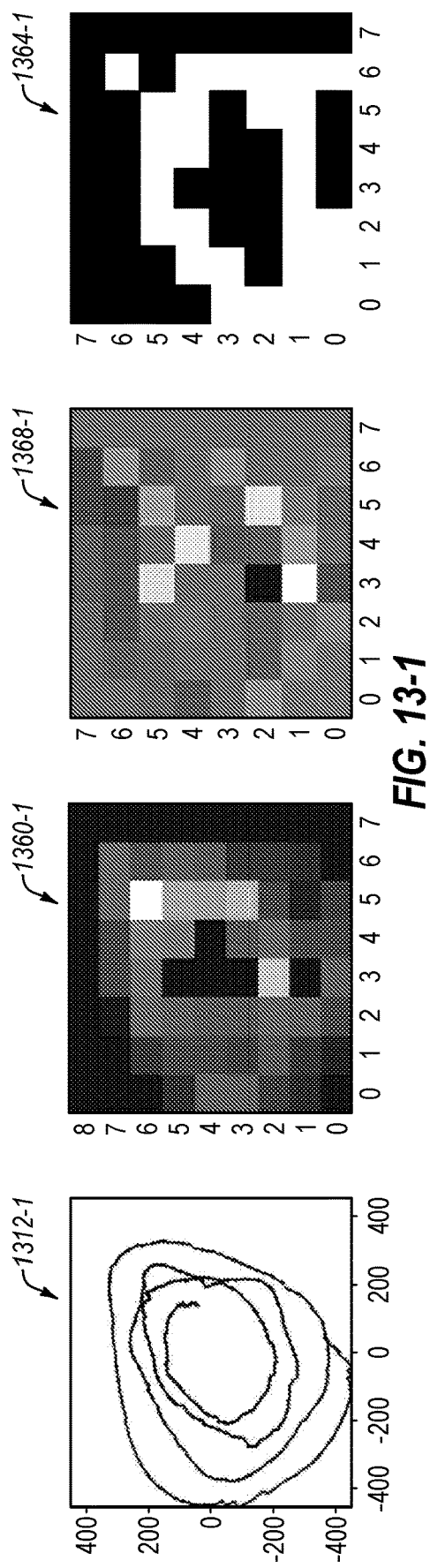
Figures 2, 13:
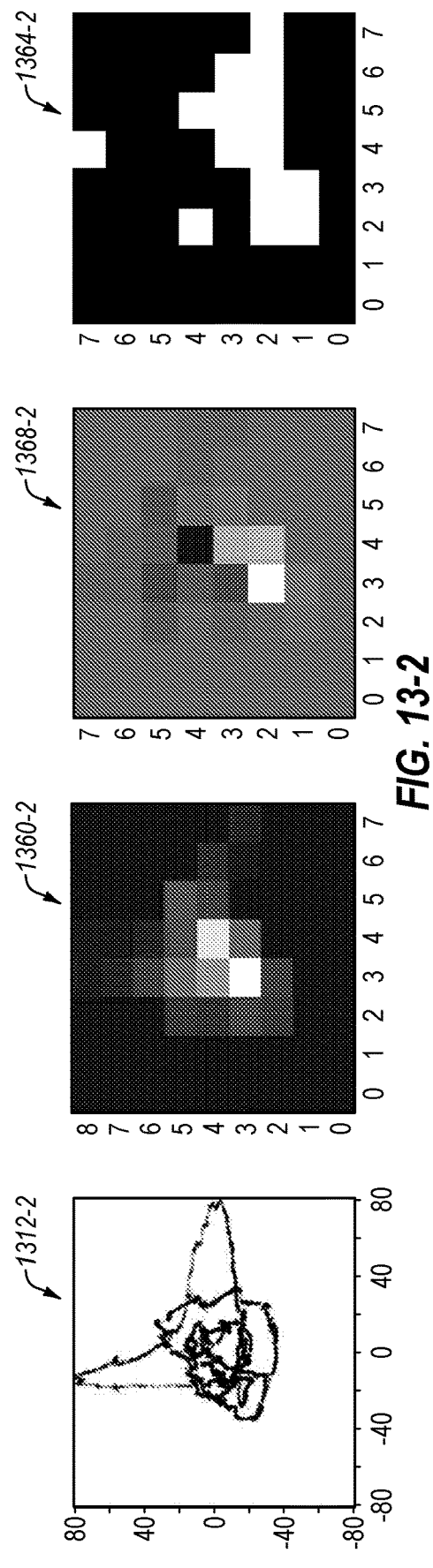

A non-limiting example of how the analyzer 110 may operate is shown and described in more detail with respect to FIGS. 2-1 to 6 and FIGS. 8-1 to 13-2. In particular, FIGS. 2-1 and 2-2 shows two example plots 212-1 and 212-2 that may be produced by the plotter 112 of FIG. 1 by using dynamic vibrational data obtained from a distributed acoustic sensor. The particular plots shown in FIGS. 2-1 and 2-2 are 2-D non-dimensional Poincaré plots. Those of ordinary skill in the art can produce Poincaré plots of non-linear dynamic processes, including multiphase flows for suitable time offsets. This may include, by way of example, determining the maximum absolute value of the data to determine the extent of the axes. This may then be used to make the results non-dimensional. As part of plotting the data, the scaling can be stored (e.g., in metadata associated with the plot, in a database with pointers to the plot, etc.), to allow recovery of the scaling. A perceptual hash of the Poincaré plot shown in FIG. 2-1 is shown in FIG. 13-1. A perceptual hash of the Poincaré plot shown in FIG. 2-2 is shown in FIG. 13-2.

Poincaré plots have been used in attempts to determine the Hausdorf exponent (which is also the fractal dimension or D-value), although embodiments of the present disclosure consider constructing the Poincaré plot even when there is not sufficient information to properly calculate the fractal dimension. In this manner, Poincaré plots in accordance with aspects of the present disclosure act as plots of non-linear processes and approximately sketch the attractor of the process (i.e., the state of a dynamic system towards which it evolves) of the process.

In some embodiments, the sensor data may be collected over a sensor period. In some embodiments, the sensor period may be in a range having an upper value, a lower value, or upper and lower values including any of 1 second (s), 2 s, 3 s, 4 s, 5 s, 6 s, 7 s, 8 s, 9 s, 10 s, 15 s, 20 s, 30 s, 1 minute (min), 5 min, 10 min, or any value therebetween. For example, the sensor period may be greater than 1 s. In another example, the sensor period may be less than 10 min. In yet other examples, the sensor period may be any value in a range between 1 s and 10 min. In some examples, the sensor period may be less than 1 s. In some embodiments, it may be critical that the sensor period is less than 10 s to provide an effective range of sensor data.

In some embodiments, the plot may include the sensor data collected over the sensor period. In some embodiments, a Poincaré plot of the sensor data collected over the sensor period may approximately sketch the attractor of the non-linear dynamic process over the sensor period (e.g., the period of time during which the sensor data was obtained).

The plot produced by the plotter 112 (e.g., plots 212-1 and 212-2) can be used by the hash generator 114 of FIG. 1 in order to reduce the plots to one or more hashes. In some aspects, the one or more hashes that are produced can include perceptual hashes.

Figure 3:
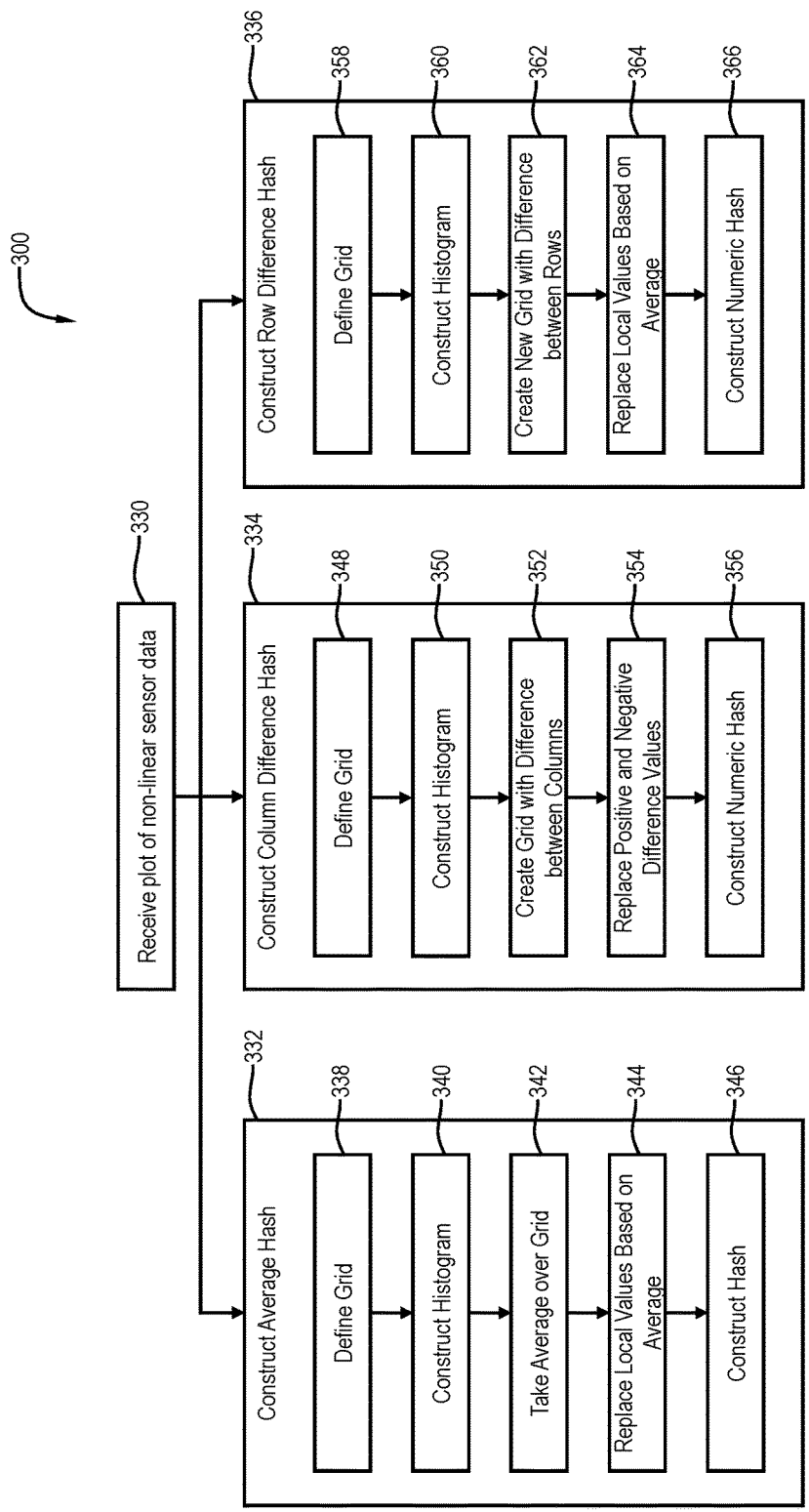
FIG. 3 is a flowchart of a method for converting sensor data into perceptual hashes, according to an embodiment of the present disclosure.

An example process 300 used by a hash generator 114 is shown in FIG. 3, and includes reducing a plot of non-linear sensor data (e.g., a Poincaré plot) to one or more perceptual hashes. In this process, the plot is received or otherwise accessed at 330. Such plot is then used to construct the hash(es), which may include constructing an average hash at 332, a column difference hash at 334, a row difference hash at 336, or some combination thereof. Other or additional hashes may also be constructed, some of which are further described herein.

To construct an average hash at 332, a grid may be defined at 338. Any suitable grid size may be defined. For instance, the grid may define areas of equal size and equal number along the length and height of the grid. In other cases, the grid define areas of different sizes and different numbers along the height and length of the grid. In some cases, the grid may define areas that are rectangular, octagonal, triangular, or of any other shape.

Using the plot and the grid, a histogram can be constructed at 340. This may generate the histogram over a coarse grid. The histogram may be constructed in any suitable manner. For instance, example methods may convert the plot into a grid of cells of a particular color or shade based on the average color of the cell, the area covered within a cell, or in other manners. In some aspect, constructing the histogram 340 may generate a type of coarse, pixelated version of the plot.

An average value of the cells in the grid may be determined at 342. Using this information, the local values in the constructed histogram may be replaced at 344. For instance, any number above the average may be replaced with a 1, and all others may be replaced with a 0 (although the opposite could also be applied). These replacement numbers may then be used to construct a hash at 346. For instance, if the grid defined at 338 is an 8×8 grid, there will be 64 binary values. Those numbers can be combined and written as a single number with 64 digits, and which corresponds to a 64-bit integer. As noted, however, other size grids may be used (e.g., 3×3, 5×5, 7×7, 9×9, 13×13, 5×9, 11×15, etc.).

Figures 1, 7:
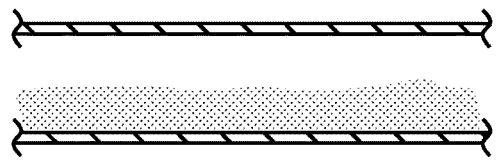
Figures 2, 7:
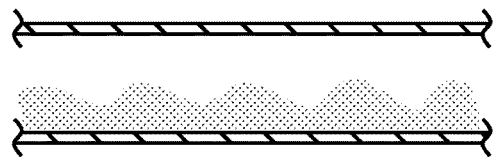
Figures 3, 7:
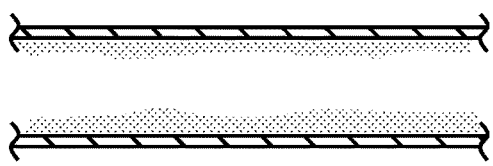
Figures 4, 7:
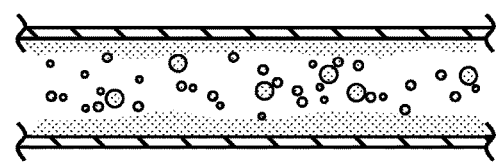

A visual interpretation depiction of a manner of constructing an average hash 332 is shown in additional detail in FIG. 4. A Poincaré plot 412 is used to define a grid at 438. In this case, the grid is an 8×8 grid. The plot 412 may be used to construct a histogram over the grid as shown at 440. For the histogram at 440 and for ease of illustration and not by way of limitation, the plot 412 has been pixelated to a grayscale image over the grid size and inverted. The average grayscale value is shown for each cell in the grid at 442. The average of these values is 18.8. Thus, each local value above 18.8 can be replaced with a 1, while each other value is replaced with a 0. If a 1 is represented in white and a 0 in black, the visual construction is shown at 444, as a binary image. Starting at cell 0:0 and working to cell 7:7, this particular image can be converted to the following 64-digit binary number:

0001000000010000000010000011111000111111000111-000000001000000001.

As an integer, this binary number is the equivalent of:
1157434167674012161.

Thus, using an average hash process as described herein, the plot 412 may be reduced to the hash value of 1157434167674012161. Returning briefly to FIG. 1, this single hash value may then be stored in the database(s) 106 and correlated with a specific flow experiment or condition. For instance, this perceptual hash may be stored as metadata for experimental results that are also stored in the database(s) 106 as shown in FIG. 1.

Returning again to FIG. 3, steps may be used to construct other types of hashes, such as a column difference hash at 334 and row difference hash at 336. Generally speaking, a column or row difference hash may be produced in a manner similar to that of the average hash, except that the hash is based on differences between columns or rows, rather than on a comparison to average values.

Accordingly, to construct the column difference hash, a grid is also defined at 348. In one embodiment, this may involve creating an additional column relative to the grid defined for the average hash at 338 (e.g., a 9×8 grid vs. an 8×8 grid). A histogram may then be constructed over the grid at 350, using a suitable method such as those described herein. Differences between local values may then be determined between columns at 352. For instance, the differences between cells in columns 0 and 1, columns 1 and 2, columns 2 and 3, and so forth may be determined. This will produce a difference grid that has one fewer columns than the grid defined at 348. The values in this difference grid may then be replaced at 354 to construct a numeric hash at 356. For instance, any positive values may be replaced with a 1, and any negative values replaced with a 0 (although the converse may instead be used). These replacement numbers may then be used to construct a hash. For instance, if the difference grid created at 352 is an 8×8 grid, there will be 64 binary values. Those numbers can be combined and written as a single number with 64 digits, and which corresponds to a 64-bit integer.

Figures 5, 7:
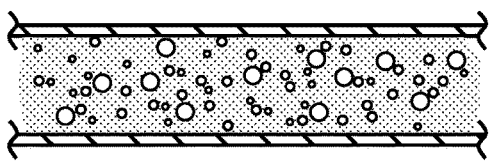
Figures 6, 7:
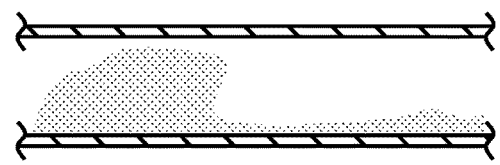
Figure 7:
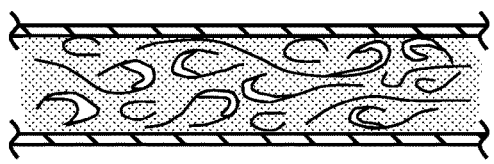

A visual interpretation depiction of a manner of constructing a column difference hash 334 is shown in additional detail in FIG. 5. A Poincaré plot 512 (which is the same as the plot 412 used for the average hash in FIG. 4) is used to define a grid at 548. In this case, the grid is a 9×8 grid. The plot 512 may be used to construct a histogram over the grid as shown at 550. For the histogram at 550, the plot 512 has been pixelated to a grayscale image over the grid size and inverted, although this is illustrative only. The grayscale value (between 0 and 255) is shown for each cell in the chart at 551. The differences between cells in adjacent columns can be determined to produce an 8×8 grid as shown at 552. For example, the difference between cell 1:3 and 2:3 in the chart 552 is 57, which is shown in the difference grid 552 in cell 1:3. Visually, cells of the difference grid 552 may also be shaded based on the local difference value.

Each local value of the difference grid 552 can be reviewed and optionally replaced. For instance, each local value above or below an average, or with an absolute value above a threshold, could be replaced. In this particular example, however, each positive number has been replaced with a 1 and each negative number with a 0. If a 1 is represented in white and a 0 in black, the visual construction is shown at 554. Starting at cell 0:0 and working to cell 7:7, this particular plot 554 can construct the following 64-digit binary number:

0011000000110000000100001101100011110000011110000000011000000011.

As an integer, this binary number is the equivalent of: 3472293836635506179.

Thus, using a column difference hash process as described herein, the plot 512 may be reduced to the hash value of 3472293836635506179. Returning briefly to FIG. 1, this hash value may then be stored in the database(s) 106 and correlated with a specific flow experiment or condition. For instance, this perceptual hash may be stored as metadata for experimental results that are also stored in the database(s) 106 as shown in FIG. 1.

A similar process may also be used to produce a row difference hash as shown at 336 in FIG. 3. Accordingly, to construct the row difference hash, a grid is also defined at 358. In one embodiment, this may involve creating an additional row relative to the grid defined for the average hash at 338 (e.g., an 8×9 grid vs. an 8×8 grid). A histogram may then be constructed over the grid at 360, using a suitable method such as those described herein. Differences between local values may then be determined between rows at 362. For instance, the differences between cells in rows 0 and 1, rows 1 and 2, rows 2 and 3, and so forth may be determined. This will produce a difference grid that has one fewer rows than the grid defined at 358. The values in this difference grid may then be replaced at 364 to construct a numeric hash at 366. For instance, any positive values may be replaced with a 1, and any negative values replaced with a 0 (although the converse may instead be used). These replacement numbers may then be used to construct a hash. For instance, if the difference grid created at 362 is an 8×8 grid, there will be 64 binary values. Those numbers can be combined and written as a single number with 64 digits, and which corresponds to a 64-bit integer.

A visual interpretation depiction of a manner of constructing a row difference hash 336 is shown in additional detail in FIG. 5. A Poincaré plot 612 (which is the same as the plots 412 and 512 used for the average and column difference hashes in FIGS. 4 and 5) is used to define a grid at 658. In this case, the grid is an 8×9 grid. The plot 612 may be used to construct a histogram over the grid as shown at 660. For the histogram at 660, the plot 612 has been pixelated to a grayscale image over the grid size and inverted, although this is illustrative only. The grayscale value (between 0 and 255) is shown for each cell in the chart at 661. The differences between cells in adjacent rows can be determined to produce an 8×8 grid as shown at 662. For example, the difference between cell 5:4 and 5:3 in the chart 662 is 25, which is shown in the difference grid 662 in cell 5:3. Visually, cells of the difference grid 662 may also be shaded based on the local difference value.

Each local value of the difference grid 662 can be reviewed and optionally replaced. For instance, each local value above or below an average, or with an absolute value above a threshold, could be replaced. In this particular example, however, each positive number has been replaced with a 1 and each negative number with a 0. If a 1 is represented in white and a 0 in black, the visual construction is shown at 664. Starting at cell 0:0 and working to cell 7:7, this particular plot 664 can construct the following 64-digit binary number:

0000000000001000011111110111111100010000000000000000001100000001.

As an integer, this binary number is the equivalent of: 2391983519695617.

Thus, using a row difference hash process as described herein, the plot 612 may be reduced to the hash value of 2391983519695617. Returning briefly to FIG. 1, this hash value may then be stored in the database(s) 106 and correlated with a specific flow experiment or condition. For instance, this perceptual hash may be stored as metadata for experimental results that are also stored in the database(s) 106 as shown in FIG. 1.

Figure 6:
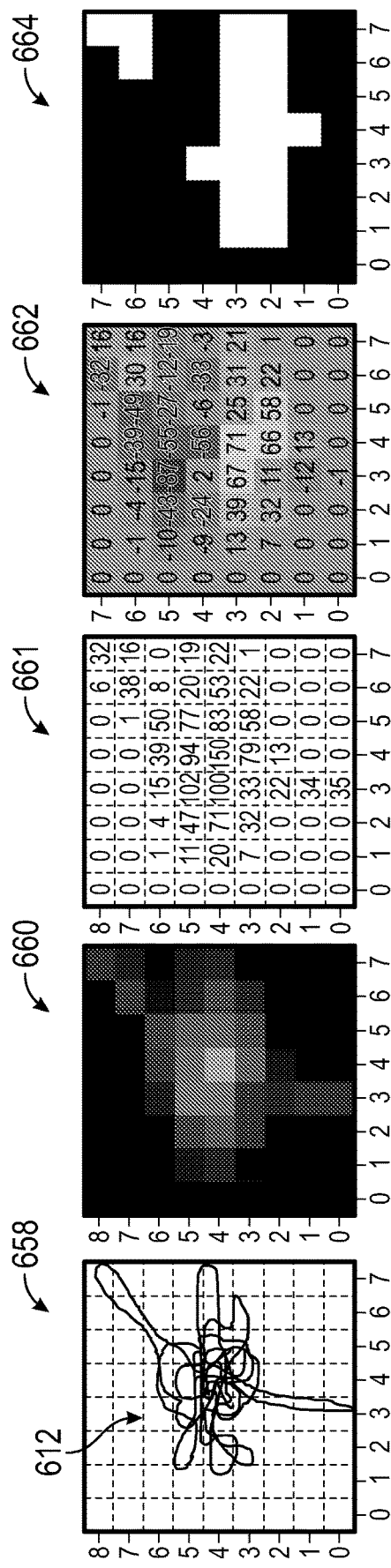
FIG. 6 is a visual representation of a manner of creating a perceptual, row difference hash, according to an embodiment of the present disclosure.

FIG. 3 illustrates the construction of average hash 332 and difference hashes 334, 336 as occurring in parallel, although it should be understood that such processes may occur sequentially or in any order, or that one or more such hashes may not be generated. Additionally, other hashes may be generated in parallel or in sequence. This may include hashes of other types, or even the same class of hash. For instance, multiple average or difference hashes may be created using different grids. As an example, each cell in the grids shown in FIGS. 4 to 6 is of about equal size; however, other grids may have differently sized grids (e.g., central cells may be smaller than boundary cells, or vice versa) (see FIGS. 8-1 to 9-4).

Referring back to FIG. 1, when the hash generator 114 has generated any one or more hashes, the hash data may be stored in the database 106. As discussed herein, the hashes that are generated may be stored in the database as metadata for other experimental or sensor data. In other cases, the hashes are stored directly and are linked to experimental data.

The stored experimental data that is stored can include a wide variety of types of information. For instance, the experimental data can include any or all of the setup information or sensor data from a test system. As discussed herein, in the context of multiphase flow, sensed parameters can include vibration, strain, temperature, flow rate, incline, load, pressure, rotation, or other dynamic conditions. Some or all of this information, as well as other information (e.g., flow conduit size, fluids used, etc.) may also be parameters of a test that are controlled and not provided by a sensor. This data may be stored over a period of time, and a hash (or set of hashes) may be associated with a particular range within the period of time the experimental data covers.

In some cases, the experimental data may also include visual data. For instance, when experiments related to multiphase flow are conducted within a flow loop, a camera (still image, video, infrared, etc.) may act as a type of sensor that records what the flow visually looks like. In some cases, the flow loop may be clear to allow an external view of the flow, although image capture devices may be within the flow in other embodiments. This image information may also be stored in the database and associated with hashes that are generated by the analyzer 110.

Figures 7, 8:
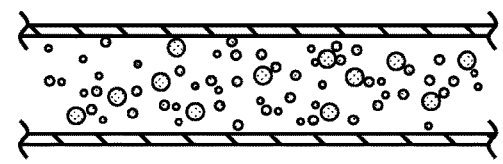
Figures 1, 2, 8:
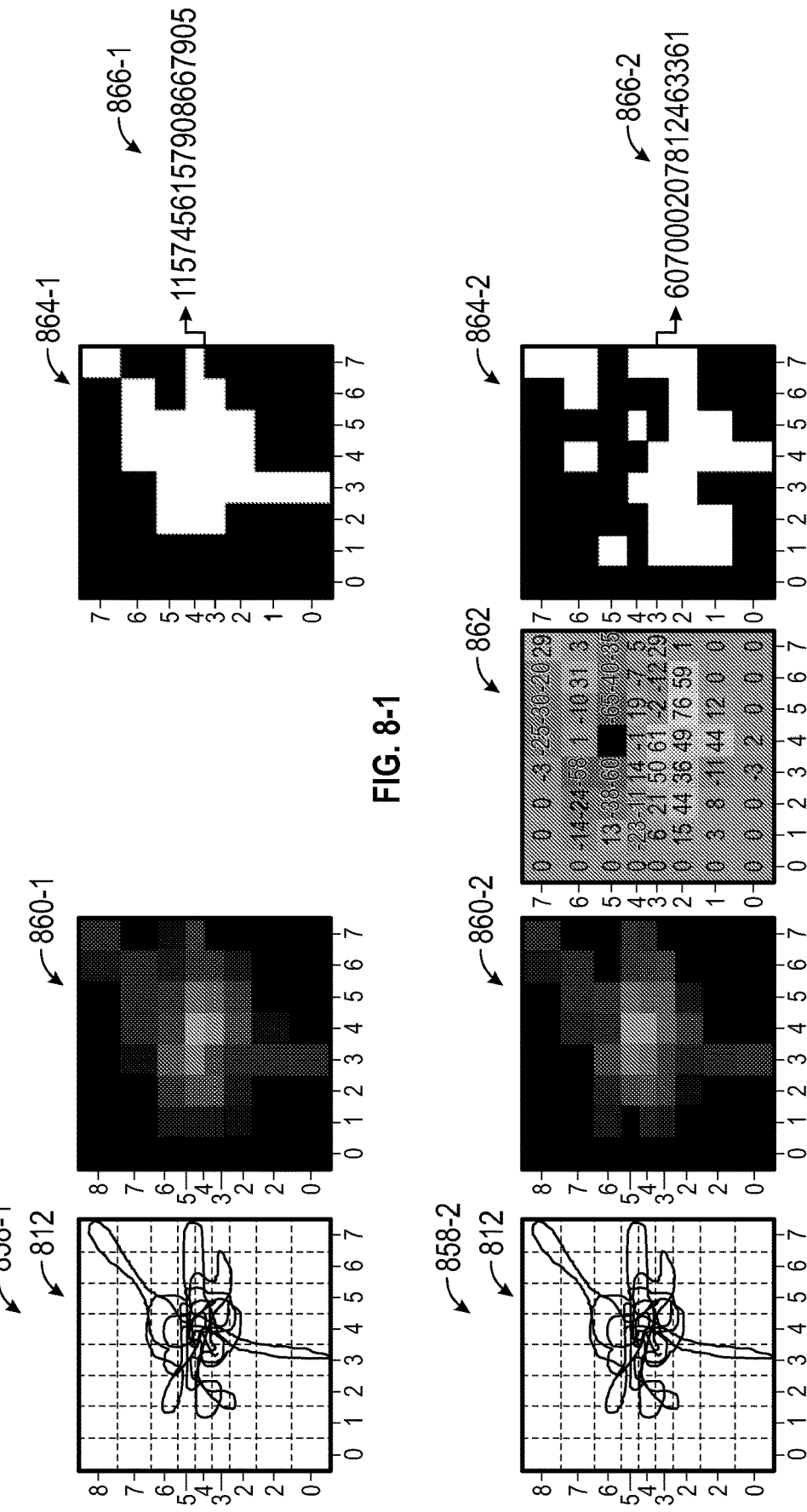

FIGS. 7-1 to 7-8 (collectively FIG. 7) schematically illustrate examples of types of horizontal multiphase flow that may be captured as a still or video image, and stored in the database 106. In particular, FIG. 7-1 depicts an example of stratified flow in a conduit, in which a liquid phase (shaded) flows as a layer that is generally separated from the gas phase (unshaded). FIG. 7-2 depicts flow similar to that in FIG. 7-1 and has separate gas and liquid layers, but the flow produces more discernible waves. FIG. 7-3 depicts annular flow, in which the liquid flows around the inner diameter of the fluid conduit, while the gas generally flows through the center of the conduit. FIG. 7-4 depicts another type of annular flow, but in this embodiment, mist or droplets are carried within the gas phase in the interior of the conduit. FIG. 7-5 depicts a dispersed bubble flow, in which the gas is contained in bubbles within the liquid. FIG. 7-6 depicts a slugging flow in which slugs of liquid (which can alternate with slugs of gas) flow along the conduit. FIG. 7-7 depicts a churning flow in which the gas is contained within the liquid and turbulence mixes the gas and liquid phases. FIG. 7-8 depicts a misting flow in which liquid mist or droplets are carried by the gas phase. Of course, the types of flow in FIG. 7 are merely illustrative, and other types of flow and combinations of flow types may be present (e.g., stratified or wavy flow with droplets in the gas phase). Similar or other phases may also be present in a vertical fluid conduit, or when additional phases are present (e.g., an additional liquid phase, solids, etc.).

In some embodiments, the types of horizontal multiphase flow shown in FIG. 7 may be intentionally generated experimentally (e.g., in laboratory conditions). Various acoustic and other sensors may sense the conditions of the multiphase flow of FIG. 7, and the experimental data recorded. The experimental data may then be analyzed, and one or more hashes associated with the experimental data generated, as discussed herein. In some embodiments, multiple hashes of the same type may be generated for each data set. For example, multiple average hashes may be generated for the same data set, with different average hashes having different grid sizes and/or grid spacing. When attempting to compare field conditions with experimental conditions, different types of hashes may be generated to improve the match (such as the Hamming distance, as discussed herein) between the field conditions and the experimental conditions.

In some embodiments, the experimental results may be compared. For example, at least two reference perceptual hashes of the experimental results of a given condition may be combined into a composite reference perceptual hash. When comparing the field perceptual hashes to the reference perceptual hashes, the field perceptual hashes may be combined into a field composite perceptual hash, and the field composite perceptual hash may be compared to the reference composite perceptual hash. In some embodiments, a composite hash may be formed from at least the average hash and the difference hash. In some embodiments, a composite hash may be formed from the average hash and the column difference hash. In some embodiments, a composite hash may be formed from the average hash and the row difference hash. In some embodiments, a composite hash may be formed between any two or more hashes. A composite perceptual hash comparison may help to increase the match between field results and identified experimental conditions.

Any number of experiments or other tests may be conducted to generate data that is used to store data associated with multiphase flow, or any other non-linear dynamic process. As discussed above, these experiments generate data sets that can be stored in the database 106, and used to generate hashes that are stored as metadata or otherwise associated with the experimental data (e.g., the original observations). In some cases, however, a database may store hashes and a unique identifier for an experiment. More information could thereafter be obtained by using the experiment identifier.

Separate from the experiments and analysis used to generate the information in the database 106, the field observation system 104 may be used to observe what is happening in a field application of a non-linear dynamic system. The field observation system 104 can include any number of sensors or sensor systems 116 to observe the non-linear dynamic process in the field. The sensor systems 116 may include sensors similar to those in the test systems 108. For instance, for field observations of multiphase flow, a distributed acoustic sensor may be used to obtain strain and/or vibration information for a particular field system.

The information from the sensor system 116 may be provided to an analyzer 118 which may operate in much the same manner as analyzer 110 in the data generating system 102. For instance, sensor information can be plotted and one or more hashes can be generated. In at least some embodiments, the analyzer 118 uses a plotting module similar to plotter 112, and generates a Poincaré plots using the same technique used by the plotter 112. That plot can then be used to generate at least one perceptual hash using the same technique used by the hash generator 114 (e.g., one or more average hashes, column difference hashes, row differences hashes, etc.).

The analyzer 118 may therefore generate a set of one or more hashes that correspond to the current conditions observed by the sensor system 116. The one or more hashes may then be used by a matching module 120 against corresponding hashes stored in the databases 106. Although databases 106 are shown as part of the data generating system 102, as discussed herein, the information from the databases 106 may be used or even replicated to a database that is part of the field observation system 104. In some embodiments, a sub-portion of the database may be used or replicated. For instance, the field observation system 104 (e.g., the matching module 120 or another database) may define hashes that correspond to an envelope of expected (or desired) conditions of the field system. The field observation system 104 may then be decoupled from the databases 106.

In some embodiments, the matching module 120 may help to maintain the field system within the envelope of expected conditions. For example, using the field conditions that are identified with respect to the experimental conditions or envelope of conditions, an operator may change one or more elements of the field system to optimize or place the field system in a desired operating condition. In this manner, a feedback loop may be set up between the sensor system(s) 116, the analyzer 118, the matching module 120, and the field operator. In some embodiments, the hashes from the reference data sets may be used to calibrate the sensor system(s) 116. For example, the field system may be run through a calibration routine. The calibration routine may place the field system in a set of known conditions with a known multiphase flow mixture. The sensor results during the calibration routine may be compared to a reference calibration perceptual hash. The differences between the field calibration results and the reference calibration perceptual hash may then be used to calibrate the sensor system(s) 116 until the field calibration results match the reference calibration perceptual hash.

Generally speaking, the matching module 120 can use the hash(es) generated by the field observation system 104 for comparison to reference hashes obtained in prior experimental or other dynamic system investigations. If the hash generated by analyzer 118 matches one in the database 106, it may be determined that the field system has similar or the same dynamic conditions as defined for the result linked to that hash. While the matching module 120 could look for an identical hash, the degree of similarity could also be determined and the one or more most similar prior hashes (and corresponding experiments or other observations) identified.

For example, an objective function for determining similarity between the field hash(es) and reference hashes in the databases 106 may include using the Hamming distance between hashes. In some embodiments, the Hamming distance, for two equal-length hashes, may be the number of different positions at which the corresponding symbols or numbers are different. As discussed herein, a perceptual hash may be converted into a binary number, and the associated binary number may be converted into a base-10 number. In some embodiments, the Hamming distance may be generated for the binary number and/or the base-10 number. The Hamming distance may be used to quickly and easily compare field perceptual hashes with experimental perceptual hashes. The Hamming distance could be determined for single hashes (e.g., one for an average hash, one for a column difference hash, etc.), or the Hamming distance may be the total for a set of available hashes (e.g., the Hamming distance for a composite hash including an average hash, column difference hash, row difference hash, etc.).

In some embodiments, a matching value between the field perceptual hash and the reference or experimental perceptual hash may be calculated to quantify the difference between the two hashes. In some embodiments, the matching value may be calculated as the percent difference between the two hashes. In some embodiments, the matching value may be calculated as the percent difference between two Hamming distances. For example, an 8×8 perceptual hash has a hash size of 64 bits. A hamming distance of 5 between two 8×8 perceptual hashes indicates that, of the 64 characters in the hash, 59 are shared between the two 8×8 perceptual hashes. Because 59 of the 64 characters are shared, the two hashes have a similarity matching value of 0.92 (e.g., 59 divided by 64). The similarity matching value may be an expression of how similar the two hashes are. The same two hashes may have a difference matching value of 0.08 (e.g., 5 divided by 64). The difference matching value may be an expression of how different the two hashes are. In some embodiments, the difference between two hashes may be represented in any other way, such as the Levenshtein Distance or the Cosine Distance (or Cosine Similarity).

Using the Hamming distance, a closest match, or set of matches from the database 106 (or from a separate database or store in the field observation system 104) may be identified. In some embodiments, the closest match or set of matches may be identified using a threshold matching value between the field perceptual hash and the one or more reference perceptual hashes. In the example described, the threshold matching value is a similarity matching value. However, it should be understood that a difference matching value may be used as the threshold matching value, with the difference matching value being one minus the similarity matching value. In some embodiments, the threshold matching value may be in a range having an upper value, a lower value, or upper and lower values including any of 0.5, 0.55, 0.6, 0.65, 0.7, 0.75, 0.8, 0.85, 0.9, 0.91, 0.92, 0.93, 0.94, 0.95, 0.96, 0.97, 0.98, 0.99, or any value therebetween. For example, the threshold matching value may be greater than 0.7. In another example, the threshold matching value may be less than 0.99. In yet other examples, the threshold matching value may be any value in a range between 0.7 and 0.99. In some embodiments, it may be critical that the threshold matching value is greater than 0.85 to provide meaningful experimental results to the field operator.

In some embodiments, a field data set may be matched with an experimental data set if the matching value is above the threshold matching value. In some embodiments, the matching value may be determined for each experimental data set in the database 106. In some embodiments, for a particular field system condition, if the threshold matching value is not above the average matching value across the database 106, then the threshold matching value may be raised. Raising the threshold matching value may reduce the number of experimental data sets above the threshold matching value. In this manner, an operator may iteratively or dynamically determine the condition that matches the field system. In some embodiments, no experimental data set may have a matching value with the field system that is above the threshold matching value, and the threshold matching value may be lowered until one or more experimental data sets have a matching value greater than the threshold matching value. In some embodiments, the data set having the highest matching value may be identified as the match for the field system.

Information about the closest match(es) for the experimental data as stored in the database 106 or linked to the database 106 (e.g., a unique identifier) can be output by the generator at 124. This information may include, or provide a reference to, the flow conditions measured in a particular experiment, which can form the basis of the output provided to an engineer, operator, or system analyst. In some cases, the output generator 124 will provide visual information to depict the flow. For example, the output generator 124 may provide an image of the data, experimental setup, actual experimental conditions (e.g., image of the non-linear dynamic process), schematic or cartoon representations of the experimental conditions, any other image, and combinations thereof. In some embodiments, the output generator 124 may provide a video of the data, experimental setup, actual experimental conditions (e.g., a video of the non-linear dynamic process), schematic or cartoon representations of the experimental conditions, any other image, and combinations thereof. This information provided by the output generator 124 may help the operator to identify challenges or other situations with the field conditions and provide potential solutions for the operator to implement.

Optionally, the field observation system 104 may include an alert generator. For instance, as noted herein, the matching module 120 may include information about a desired operating envelope for a dynamic non-linear system. If the hashes generated by the analyzer 118 do not fall within that envelope (e.g., if the hashes do not match an expected set of hashes from one or more envelope reference data sets), the alert generator 122 may create an electronic, visual, audio, or other alert to indicate the presence of unexpected or undesired system dynamics.

In some cases, the matching module 120 may not identify any suitable matches, or may identify more than one potential match. In such case, the output generator 124 may indicate that there were no matches or multiple matches. In other cases, additional hashes may be generated and compared to further data in the database 106 (or elsewhere) to determine a likely flow condition.

By way of example, the analyzer 118 may plot the data and create perceptual hashes of that plot on an 8×8 grid (or a difference hash originating from a 9×8 grid or an 8×9 grid). If there are no matches, the analyzer 118 may perhaps use the plot to create perceptual hashes on a 7×7, 6×6, or 5×5 grid and the matching module 120 may then compare those hashes against corresponding 7×7, 6×6, or 5×5 hashes stored in the database 106 and which correspond to the experimental results. Thus, the experiments used to populate the database 106 may include multiple sets of hashes for different sizes or types of grids. When a matching/similar hash is then found, that information can be output.

If there are multiple reference hashes from experimental data that are deemed similar to the hash for the field observed data, the analyzer may then define different grid types or sizes to determine which of the experimental data is most similar to the field data. In some embodiments, for each matching reference hash, the analyzer may generate an additional perceptual hash and compare the additional perceptual hashes to additional reference hashes that may be stored in the database. For instance, the plot may be used to create perceptual hashes of the field data on a finer grid (e.g., 9×9, 10×10, 11×11, etc.) until one or fewer sets of experimental data are determined to be most similar to the field observed data. In the same or other embodiments, the grid pattern may change. For instance, in FIGS. 4-6, the grid has equal sized cells. In other embodiments, however, the cells may have different sizes. By way of illustration, FIGS. 8-1 and 8-2 illustrate examples of creation of an average hash (FIG. 8-1) and row difference hash (FIG. 8-2) in which the rows have different heights.

In the embodiment shown in FIG. 8-1 and FIG. 8-2, a Poincaré plot 812 has been plotted. A grid (collectively 858) has been placed over the Poincaré plot 812. In the embodiment shown, the central rows have smaller row heights while the cell heights of the outer rows are larger. For example, in the first grid 858-1 shown in FIG. 8-1, rows 3 and 4 have a smaller row height than the remaining rows, and rows 2 and 5 have a row height that is larger than rows 3 and 4, and smaller than rows 0, 1, 6, and 7. In the second grid 858-2 shown in FIG. 8-2, rows 3, 4, and 5 have a smaller row height than the remaining rows, and rows 2 and 6 have a row height that is larger than rows 3, 4, and 5, but smaller than rows 0, 1, 7, and 8. The grid 858 over the Poincaré plot 812 may be used to generate a histogram (collectively 860) of the data. For example, a first histogram 860-1 of the Poincaré plot 812 may be generated using the first grid 858-1 and a second histogram 860-2 of the Poincaré plot 812 may be generated using the second grid 858-2. In FIG. 8-1, the Poincaré plot 812 has been used to generate an average histogram 860-1. Using the average histogram 860-1, an average hash visual construction 864-1 has been produced. This may then be used to generate a base-10 perceptual average hash 866-1. In FIG. 8-2, the Poincaré plot 812 has been used to generate a row difference histogram 860-2. The differences in grayscale values of the row difference histogram 860-2 are shown at 862. This plot is then used to generate a visual construction 864-2 of the row difference hash, which can itself be used to generate a base-10 perceptual row difference hash 866-2.

This type of plot may provide additional information about the center of the plot, where there is more information, than the outlying boundaries of the plot. Generating multiple hashes on a different grid types may help to improve the match between field sensor data and experimental data, thereby identify a higher likelihood matching reference data set.

Notably, while the plot for FIGS. 8-1 and 8-2 is the same as that used for FIGS. 4 and 6, the variable difference grid can generate a perceptual hash that is quite different. Thus, when the matching module 120 uses this additional hash information, more refined results may be obtained. For instance, the experimental data that was previously determined to be similar may also have hashes generated with variable grid spacing corresponding to that of FIGS. 8-1 and 8-2, and the matching algorithm may use the Hamming distance to determine that one or fewer of those results are now similar. This may also be an iterative process using different numbers of cells and different sizes of cells until a particular match is found.

Figures 1, 9:
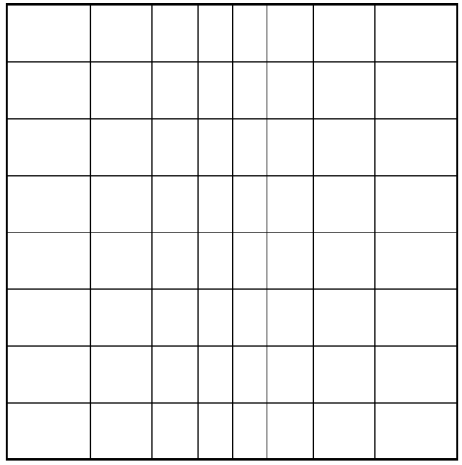
Figures 2, 9:
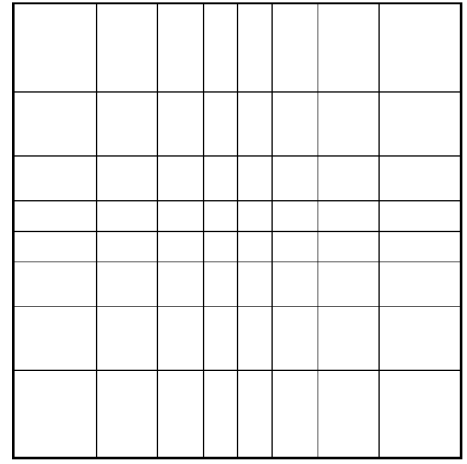
Figures 3, 9:
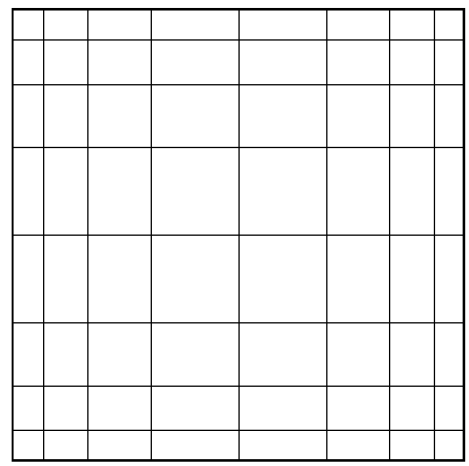
Figures 4, 9:
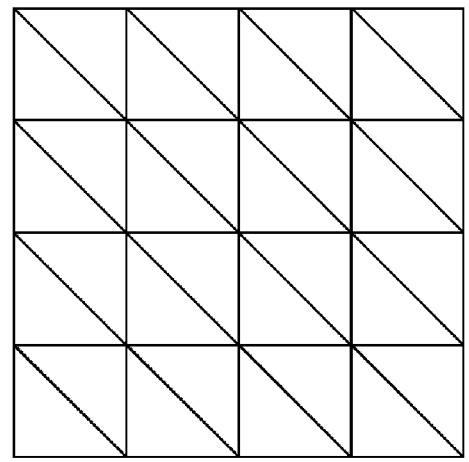

FIGS. 8-1 and 8-2 should be appreciated to be illustrative only. Indeed, while FIG. 8-2 shows a row difference hash, the same process described herein could be used for the same row heights in FIG. 8-1 to produce a column difference hash. Additionally, other grids may have variable column widths as shown schematically in FIG. 9-1. In still other embodiments, a grid may have variable column and row sizes as shown in FIGS. 9-2 (smaller inner columns/rows) and 9-2 (larger inner columns/rows). In still other cases, a grid may have non-square or non-rectangular cells (see FIG. 9-4).

Example 1

To further illustrate aspects of the present disclosure, example experiments were performed. The experiments were performed in a flow loop to evaluate multiphase flow; however, are applicable to any other dynamic non-linear system. In this example, the flow loop featured severe slugging flow through a vertical riser. The flow was monitored using a distributed acoustic fiber optic sensor at 10 kHz, and the acquired data was separated into approximately 6,000 intervals each having a 1-second duration. In this particular example, the first 3,000 seconds of the experiment were treated as the field test examples, and the rest as the database.

Based on a visual review of samples having a time shift from 0.01 to 0.07 second, a time shift of 0.05 second was chosen for the construction of the Poincaré plots. The patterns with this time shift were visually consistent with time shifts of 0.04 to 0.06 second. Notably, while a single time shift was used in this Example 1, the disclosure also encompasses using multiple time shifts, and even automating selection of a time shift. Notably, scaling of the plots as described with respect to FIGS. 2-1 and 2-2 were not used in this Example 1, but could be useful and form part of the objective function used by a matching module.

For a depth in the middle of the riser, an average 8×8 perceptual hash, a row difference 8×8 perceptual hash, and a column difference 8×8 perceptual hash were calculated. Each hash had 64 bits, and a composite hash combining the hashes had 192 bits. As a measure of similarity, the bitwise difference between the composite hash and a database of examples was computed using the Hamming distance and reported as a fraction of the bits that were similar. Thus, a value of 0.92 would indicate that a corresponding database example had 16 bits different across the 192 bits of the composite hash.

Figures 1, 10:
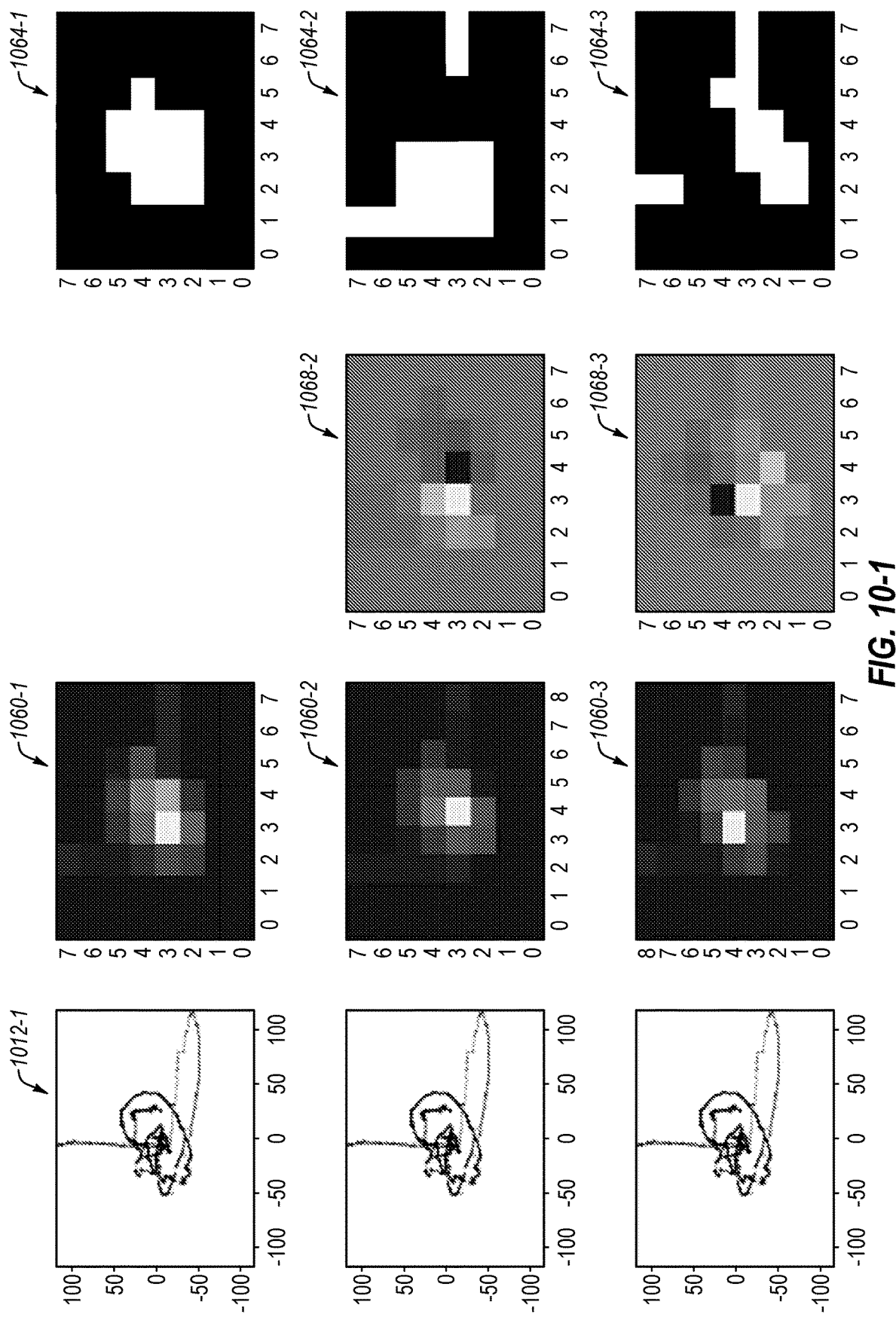
Figures 2, 10:
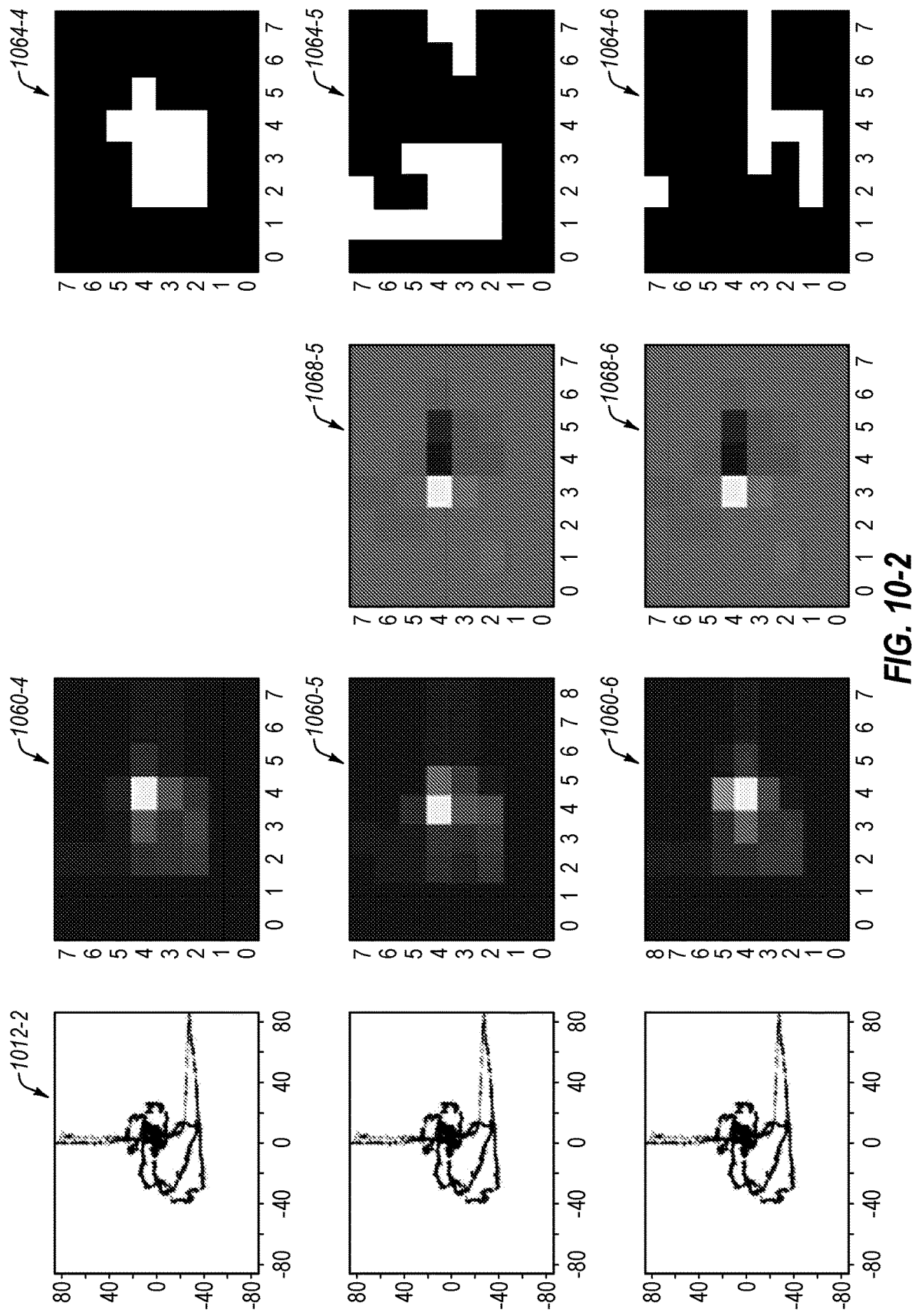

Computation of the three hashes computed for the field data is shown in FIG. 10-1, and the most closely matching experimental data is shown in FIG. 10-2. In this particular embodiment, rather than converting to a grayscale image, the hash is generated using an average of color saturation. In some embodiments, the difference hash can represent a derivative or rate of change (e.g., rate of change in x (between columns) or in y (between rows)). The difference hash therefore works as a type of edge detector.

In the embodiment shown in FIG. 10-1, various grids placed over a field data Poincaré plot 1012-1 is used to generate histograms (collectively 1060) of the Poincaré plot 1012. An average histogram 1060-1 is shown in the top row, a row difference histogram 1060-2 is shown in the middle row, and a column difference histogram 1060-3 is shown in the bottom row. The row difference histogram 1060-2 may be used to generate a visual representation of the row differences 1068-2. The column difference histogram 1060-3 may be used to generate a visual representation of the column differences 1068-3.

The average histogram 1060-1 may then be used to generate a visual representation of the average hash 1064-1. The average hash 1064-1 may then be used to generate the binary perceptual hash, which, in this case, may have a base-10 value of 61814177529856. The row difference histogram 1060-2 and/or the row differences 1068-2 may be used to generate a visual representation of the row difference hash 1064-2. The row difference hash 1064-2 may then be used to generate the binary perceptual hash, which, in this case, may have a base-10 value of 123461109954624. The column difference histogram 1060-3 and/or the column differences 1068-3 may be used to generate a visual representation of the column difference hash 1064-3. The column difference hash 1064-3 may then be used to generate the binary perceptual hash, which, in this case, may have a base-10 value of 135725047443370208.

In FIG. 10-2, a grids placed over an experimental Poincaré plot 1012-2 are used to generate similar hashes. Specifically, an average histogram 1060-4 is shown in the top row, a row difference histogram 1060-5 is shown in the middle row, and a column difference histogram 1060-6 is shown in the bottom row. The row difference histogram 1060-5 may be used to generate a visual representation of the row differences 1068-5. The column difference histogram 1060-6 may be used to generate a visual representation of the column differences 1068-6.

The average histogram 1060-4 may then be used to generate a visual representation of the average hash 1064-4, which has a binary perceptual hash with a base-10 value of 61814176481280. The row difference histogram 1060-5 and/or the row differences 1068-5 may be used to generate a visual representation of the row difference hash 1064-5, which has a binary perceptual hash with a base-10 value of 123641124634720. The column difference histogram 1060-6 and/or the column differences 1068-6 may be used to generate a visual representation of the column difference hash 1064-6, which has a binary perceptual hash with a base-10 value of 15771527932805152.

Comparing the binary representation of the integers shown as the hash (i.e., the Hamming distance), the matches between the field data represented by the field Poincaré plot 1012-1 and the experimental Poincaré plot 1012-2 were found to match at 0.953125, which corresponds to a 9-bit difference across the 192-bit composite hash. Indeed, it is apparent visually from the field Poincaré plot 1012-1 and the experimental Poincaré plot 1012-2 that the examples are similar in character. Similarly, the histograms 1060 and the visual representations of the hashes 1064 indicate that the examples are similar in character. In this manner, the operator may determine that the conditions indicated by the experimental reference data set are present in the field system. This may allow the operator to maintain the field system to maintain the identified conditions or change one or more elements of the field system to change the field conditions.

Figures 1, 11:
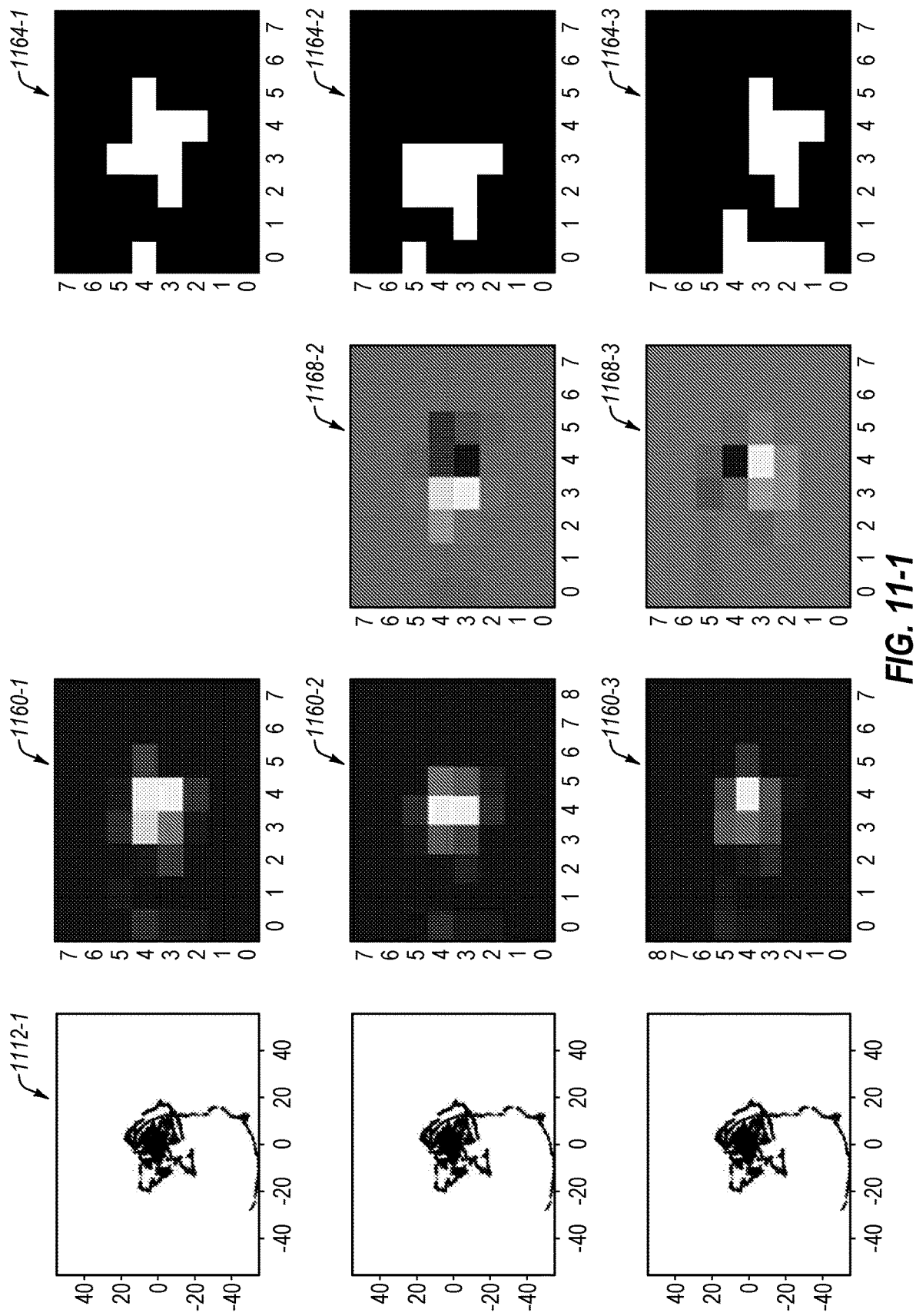
Figures 2, 11:
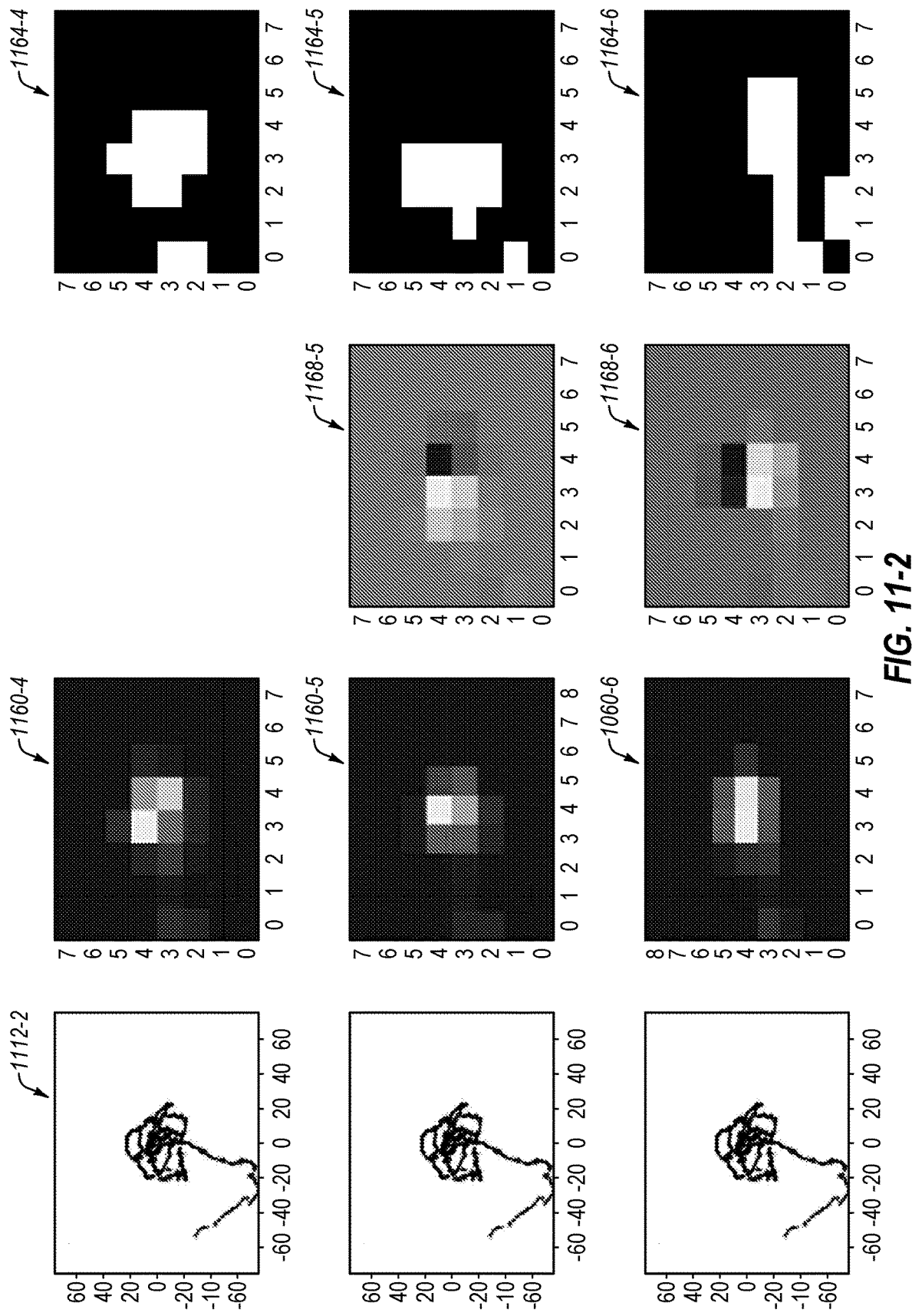

FIG. 11-1 and FIG. 11-2 provide a comparison of a difference characteristic of the field system to an experimental system. Specifically, a field Poincaré plot 1112-1 may be used to generate a field average histogram 1160-1, a field average hash graph 1164-1, and a field average hash with a base-10 value of 9039229485056. The field Poincaré plot 1112-1 may also be used to generate a field row difference histogram 1160-2, a field row difference plot 1168-2, a field row difference hash graph 1164-2, and a field row difference hash with a base-10 value of 18074039222272. The field Poincaré plot 1112-1 may further be used to generate a field column difference histogram 1160-3, a field column difference plot 1168-3, a field column difference hash graph 1164-3, and a field column difference hash with a base-10 value of 38483580208283648.

An experimental Poincaré plot 1112-2 may have previously been used to generate an experimental average histogram 1160-4, an experimental average hash graph 1164-4, and an experimental average hash with a base-10 value of 16716981977088. The experimental Poincaré plot 1112-2 may also be used to generate an experimental row difference histogram 1160-5, an experimental row difference plot 1168-5, an experimental row difference hash graph 1164-5, and an experimental row difference hash with a base-10 value of 36082055421886464. The experimental Poincaré plot 1112-2 may further be used to generate an experimental column difference histogram 1160-6, an experimental column difference plot 1168-6, an experimental column difference hash graph 1164-6, and an experimental column difference hash with a base-10 value of 6953835021849329664. Using the Hamming distance, these examples were found to have a 0.911458 match, which corresponds to a 17-bit difference over the 192-bit composite hash. The visual similarities between these plots and hashes is also quite evident from a visual inspection of FIGS. 11-1 and 11-2. In this manner, the operator may determine that the field data closely matched the experimental data. This indicates that the conditions associated with the experimental data set are likely present in the field data. This may help the operator to manage the operation of the field system, such as by changing certain operating conditions.

Figure 12:
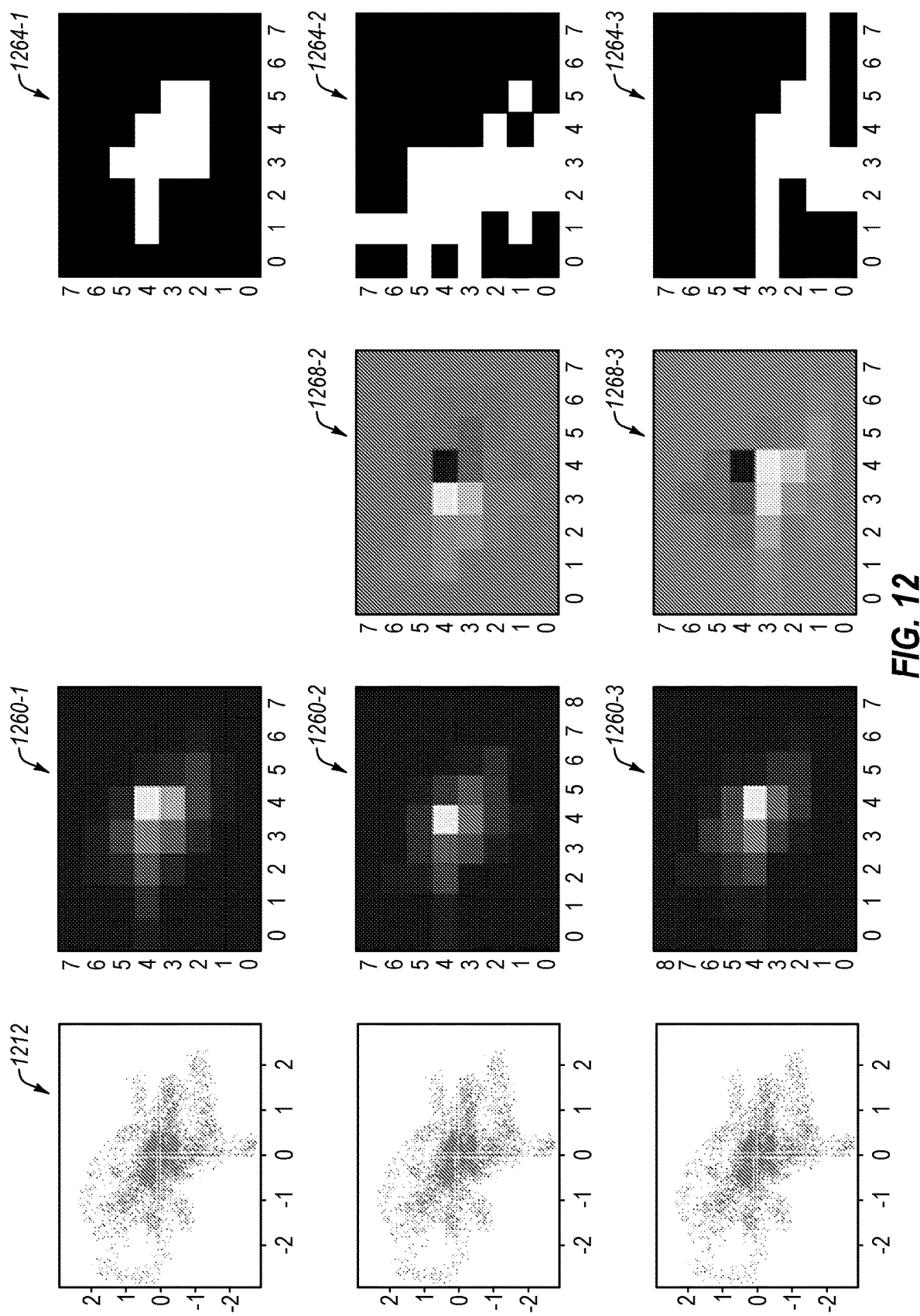
FIG. 12 is, an illustration of the generation of a set of perceptual hashes of a data set that has low scaling and high central detail, according to an embodiment of the present disclosure.

In the dataset of Example 1, the variation in scale was quite dramatic. In the Poincaré plots, this is visible as the images have significant detail in the center of the plot and reduced detail when moving outward toward the outer rim. Other plots, such as the Poincaré plot 1012-1 of FIG. 10-1, the Poincaré plot 1012-2 of FIG. 10-2, the Poincaré plot 1112-1 of FIG. 11-1, or the Poincaré plot 1112-2 of FIG. 11-2, were seen that have loops around the center, but with reduced scale, in which case the detail in the center was already quite evident. To more clearly delineate the central detail, and as discussed herein, an irregular grid may be used for the construction of the hashes. FIG. 12 illustrates the delineation this additional detail may present.

In particular, FIG. 12 illustrates the generation of a hash from the Poincaré plot 1112-2 of FIG. 11-2 when using a scale of ±3, as opposed to a scale of ±80 as shown in FIG. 11-2, and generally shown in other Poincaré plots discussed herein. Specifically, in FIG. 12, a Poincaré plot 1212 may be used to generate an average histogram 1260-1, an average hash graph 1264-1, and an average hash having a base-10 value of 30908598976512. The Poincaré plot 1212 may also be used to generate a row difference histogram 1260-2, a row difference plot 1268-2, a row difference hash graph 1264-2, and a row difference hash with a base-10 value of 4067938968760500288. The Poincaré plot 1212 may further be used to generate a column difference histogram 1260-3, a column difference plot 1268-3, a column difference hash graph 1264-3, and a column difference hash with a base-10 value of 3476529288830779392. Using scaling focusing on the center or other highly detailed portion of the plot may therefore generate additional detail and granularity for matching flow conditions.

FIG. 13-1 is a representation of a Poincaré plot 1312-1 including the data from the Poincaré plot 212-1 of FIG. 2-1, in accordance with at least one embodiment of the present disclosure. The Poincaré plot 1312-1 includes 1 second of 10 kHz data from an acoustic sensor on a fiber optic sensor. Poincaré plot 1312-1 may be used to generate a row difference histogram 1360-1 of the results, having a difference plot 1368-1 which may be used to generate a binary hash plot 1364-1. FIG. 13-2 is a representation of a Poincaré plot 1312-2 including the data from the Poincaré plot 212-2 of FIG. 2-2, in accordance with at least one embodiment of the present disclosure. The Poincaré plot 1312-2 includes 1 second of 10 kHz data from another acoustic sensor on a fiber optic sensor. Poincaré plot 1312-2 may be used to generate a row difference histogram 1360-2 of the results, having a difference plot 1368-2 which may be used to generate a binary hash plot 1364-2.

In some embodiments, the methods of the present disclosure may be executed by a computing system. For instance, a computing system may include a computer or computer system that is an individual computer system or an arrangement of distributed computer systems. The computer system can include one or more analysis modules that are configured to perform various tasks according to some embodiments, such as one or more methods disclosed herein. Example modules or computing systems may be in the form of special-purpose tools (e.g., sensors, fiber optic packages, edge computing devices, etc.). To perform these various tasks, one or more analysis modules execute independently, or in coordination with, one or more processors, which are connected to one or more computer-readable media. The processors are optionally connected to a network interface to allow the computer system to communicate over a data network with one or more additional computer systems and/or cloud computing systems that may or may not share the same architecture, and may be located in different physical locations. For instance, in an oil and gas context, one computer system may be located on a drilling rig adjacent a wellbore, in a downhole tool, or at a pipeline location. Another computer system may be in a service center, in a doghouse, at a pipeline inlet or outlet, in a remote computing center, another may be in a cloud-computing facility or data center, and any may be located in varying countries on different continents. Similarly, in a medical diagnostic or other context, one computer system may be included in, or coupled to, a particular type of sensing device (e.g., diagnostic tool, gyroscope/load cell in self-stabilizing system, etc.). Another computer system may be located in a remote location and connected via a cloud computing or other network interface, or even in another component within the same system.

A processor may include a microprocessor, microcontroller, processor module or subsystem, programmable integrated circuit, programmable gate array, or another control or computing device. Additionally, while computer-readable media may be within a computer system, in some embodiments, computer-readable media may be distributed within and/or across multiple internal and/or external enclosures of a computing system and/or additional computing systems. The computer-readable media may be implemented as one or more computer-readable or machine-readable storage media, transmission media, or a combination of storage and transmission media.

As used herein, "storage media", "computer-readable storage media," and the like refer to physical media that stores software instructions in the form of computer-readable program code that allows performance of embodiments of the present disclosure. "Transmission media", "computer-readable transmission media," and the like refer to non-physical media which carry software instructions in the form of computer-readable program code that allows performance of embodiments of the present disclosure. Thus, by way of example, and not limitation, embodiments of the present disclosure can include at least two distinctly different kinds of computer-readable media, namely storage media and/or transmission media. Combinations of storage media and transmission media are included within the scope of computer-readable media.

To further illustrate the distinct nature of storage media and transmission media, storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or solid state drives, or other types of storage devices.

Transmission media may conversely include communications networks or other data links that enable the transport of electronic data between computer systems and/or modules, engines, and/or other electronic devices. When information is transferred or provided over a communication network or another communications connection (either hardwired, wireless, or a combination of hardwired or wireless) to a computing device, the computing device properly views the connection as a transmission medium. Transmission media can therefore include a communication network and/or data links, carrier waves, wireless signals, and the like, which can be used to carry desired program, code means, or instructions.

Note that the instructions discussed above may be provided on one computer-readable or machine-readable medium, or may be provided on multiple computer-readable or machine-readable media distributed in a large system having possibly plural nodes. Such computer-readable or machine-readable medium or media is (are) considered to be part of an article (or article of manufacture). An article or article of manufacture may refer to any manufactured single component or multiple components. The computer-readable medium or media may be located either in the machine running the machine-readable instructions, or located at a remote site from which machine-readable instructions may be downloaded or otherwise transferred over a network for execution. Further, where transmission media is used, upon reaching various computing system components, program code in the form of computer-executable instructions or data structures can be transferred automatically or manually from transmission media to storage media (or vice versa). For example, computer-executable instructions or data structures received over a network or data link can be buffered in memory-type storage media (e.g., RAM) within a network interface module (MC), and then eventually transferred to computer system RAM and/or to less volatile storage media (e.g., a hard drive) at a computer system. Thus, it should be understood that storage media can be included in computer system components that also (or even primarily) utilize transmission media.

It should be appreciated that described computing systems are merely examples of computing systems, and that a computing system may have more or fewer components than described, may combine additional components not described, or may have a different configuration or arrangement of the components. The various components of a computing system may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and other interpretation aids may be refined in an iterative fashion, and this concept is applicable to the methods discussed herein. This may include use of feedback loops executed on an algorithmic basis, such as at a computing device, or through manual control by a user who may make determinations regarding whether a given event, action, template, model, or set of charts/hashes has become sufficiently accurate or matched for the evaluation of the data (e.g., sensor data or corresponding hashes related to non-linear dynamic processes) under consideration.

INDUSTRIAL APPLICABILITY

Multiphase flow in a pipeline is an example of a dynamic non-linear system having complexities in the flow regime, flow rate, etc. that are far more difficult to evaluate than for a single-phase flow system with more linear dynamics. Because of the various hydrodynamics and the corresponding turbulence, multiphase flow will further influence the operation of the corresponding well, pipeline, or other flow conduct. For instance, internal corrosion rate and pump efficiency may be significantly different from that of single-phase flow.

Multiphase flow can include any combination of two or more phases, which may be in the form of any combination of solids, liquids, or gases. For example, multiphase flow can include: oil and natural gas; oil and water; oil, water, and natural gas; heavy oil, drilling mud, water, and natural gas; oil and solids; drilling mud, oil, and solids; and the like. Accurate measurement and characterization of multiphase flow states can be used to optimize the production in a hydrocarbon producing well, the determination of the composition of production stream and quantity, and for other purposes.

Particularly due to the non-linear dynamic nature of multiphase flow, attempts to determine multiphase flow conditions have been challenging in certain environments. For instance, plots of non-linear dynamic processes have been used to attempt to determine the Hausdorf exponent (i.e., the fractal dimension or D-value); however, these processes are numerically intensive and require long time series. As a result, computing this information at the Edge (i.e., at the field location) is impractical for real-time field applications. Additionally, the flow is generally required to be pseudo-steady-state over the time period studied, and multiphase flow may not have this stability present.

In practice, the flows with liquid and gas move around and create vibrations. These vibrations can be relatively fast, such as on the order of 5 to 10 kHz. A sensor may therefore collect data at a rate that is at least as fast as the vibration data (e.g., 10 to 20 kHz). The amount of data produced by using a fiber optic or other sensor can therefore be significant, which may be beyond the capabilities for analysis by a downhole tool using the fractal dimension, making it difficult to determine flow regimes (e.g., gas bubbles in liquid, alternating liquid gas slugs, annular liquid flow around the outside and gas in the middle, etc.).

To provide real-time characterization of flow conditions, the field sensor data may be plotted, but perceptual hashes can be generated from that data. As discussed herein, the perceptual hashes can then be compared to existing information to determine whether the flow is outside a desired envelope of conditions, or to characterize the nature of the flow. Comparison of hashes can be done more rapidly than fractal dimension analysis, and both computing and comparing hashes can be done in near real-time.

In a particular application consistent with the present disclosure, a database of measurements of a non-linear dynamic processes is constructed using one or more instrumented experimental test systems (e.g., flow loops). For example, an inclinable flow loop table can be used to build a database of measurements for water-oil-gas flows across many different flow conditions. Plots (e.g., Poincaré plots) of the non-linear dynamic responses for different sensor types can be recorded as perceptual hashes to form the core of the database.

In the field, one or more sensors can be deployed. For instance, a distributed acoustic sensor can be used, and a plot of the response of the field sensor can be generated and then recorded as perceptual hashes. This information can be highly compressed (1 64-bit integer for a perceptual hash) and so can very efficiently be transmitted from wellsite or other field location, if needed.

The perceptual hashes from the field sensor can be compared to the perceptual hashes in the database, such as by using the Hamming distance. The examples in the database with near-neighbor perceptual hashes can form a set and can be used to define the envelope of experimental conditions that have similar non-linear dynamics to the process being monitored in the field. If multiple perceptual hashes are made for the same data, the results can be combined to reduce the size of (e.g., narrow) this envelope. Optionally, the returned envelope can be analyzed to determine what additional measurement and/or measurement type would be most discriminating to narrow down the possibilities (e.g. the intersection of two envelopes from within the core database). In the same or other examples, the best-fit database result could be used to provide feedback.

For example, in the multiphase flow monitoring case, the closest perceptual hash in the database could return the video-clip of the flow conditions, so that an end-user could view a synthetically generated flow visualization with similar statistics to the flow being monitored.

In an example application, a fiber optic cable can be deployed in a wellbore that is producing multiphase flow. During each time interval (e.g., 0.5 second, 1 second, 2 second, etc.) a set of one or more perceptual hashes (e.g., 3 hashes) can be generated for a selected location. These hashes may be sent to the cloud and a closest matching example from the database can be located. Using the time code of the closest match in the database, a video clip or image corresponding to the same time code can be retrieved and provided to the user. This may provide the user with a near real-time visual appreciation of the type of flow occurring at depth in the wellbore. The user may then understand the flow conditions to make a determination on whether to change operating conditions (e.g., electric submersible pump parameter) to optimize the flow.

In another example, flow at a wellsite is monitored by multiple sensors, or even with a single sensor. The pattern from each sensor (or the sole sensor) can provide an envelope of possible corresponding flows. From the database, the responses of other sensors can be accessed, and those most suitable for discriminating the flow within the envelope can be selected. This informs us of the additional sensors that may be needed or used to construct a flow meter for a particular case.

According to another application, both point and distributed sensors and combinations of sensors may be used to provide advance warning of certain flow regime transitions. These may include, for example: the onset of severe slugging; phase transitions in the flow; bubble point; wax onset; and asphaltene onset. For some operations, the hash generated by a sensor is identified within a certain range of hashes in the database. As soon as the match moves outside the expected region, an alarm is raised, thereby identifying potentially dangerous or detrimental flow regime transitions.

Two sensors employing different physical interactions with a flowing system may be used in another application, and will have a range of characteristic hashes that can follow each other in a specific pattern. This pattern can be consistent when compared to the reference/experimental hash collection, and also consistent with the accumulated measured hashes. The operator may evaluate whether the sensed data sets generate perceptual field hashes that maintain an expected pattern. If the hashes deviate from the expected pattern, then one or both of the sensors may be determined to have a potential issue, or can indicate the system has moved outside the envelope of one or both of the sensors. Thus, the health of the system or even an individual sensor may be monitored.

In another example application related to advanced calibration and interpretation of flowmeters, a flowmeter monitoring a complex flow (e.g., rapidly time varying, multiphase, stopping/starting, etc.) may produce a signal that can be used to create a plot (e.g., a Poincaré plot) and image hash. This hash can be compared to a reference library of hashes, to identify the most likely flow regime and hence a potential reinterpretation or recalibration of the meter to improve its accuracy.

Another example use of embodiments of the present disclosure relates to identifying equivalent low order dynamical systems. For instance, once a flowmeter or other sensor is producing data from a complex flow, low order dynamical models that display the same characteristics can be identified. These low order models can be used for forward modelling of the system and to identify the sensitivity to changing input parameters. The hash can capture some of the non-linearity of the system that is missed by classical flowmeter interpretations.

Various additional applications are contemplated, and the present disclosure will be understood to apply to numerous non-linear dynamic processes. These may be inside the oil and gas industry (e.g., multiphase flow), medical industry (e.g., diagnostics), robotics industry (e.g., self-stabilization), or other industries or applications.

Further, while specific examples are provided herein, other solutions and processes should be understood to be within the scope of the present disclosure. For instance, any of numerous types of sensors and experimental or field test systems may be used. These systems may be used to generate Poincaré plots or any other suitable plot that may be used to generate a hash. Whatever plot is used may be used to generate a hash on a grid of a suitable size (e.g., 5×5, 8×8, 13×13, etc.). Hashes can be perceptual hashes, which are designed to produce similar output when the input is similar. This can be different than a cryptographic hash designed to produce large differences in the output based on small differences. Example perceptual hashes include average or median hashes (e.g., based on luminosity or color), difference hashes (e.g., gradient or edge detection, or row/column differences), wavelet hashes, perceptive hashes (e.g., Discrete Cosine Transformation or DCT), angular gradient hashes (e.g., hog hash), rotational hashes (e.g., rotational average or rotational frequency-based hashes), and the like. Moreover, multiple hash types may be used, particularly as different types of hashes may have different qualities (e.g., DCT and difference hashes can have higher relative precision, while wavelet and average hashes can have higher relative recall). Indeed, while different hashes are combined in examples herein, in some cases, a lower precision hash (e.g., lower precision type of hash, lower precision grid, etc.) may be used against the reference data to identify a potential set of matches, and higher precision hashes may be used in subsequent steps to refine which of the identified potential matches is most similar.

Additionally, the manner of producing the hash can be varied. For illustration purposes, some examples (see FIGS. 4 to 6) have shown an example in which a hash is generated by transforming an image to a grayscale representation, and using the grayscale-value to define bits of the hash. Other methods are possible. Indeed, FIGS. 10-1 to 13-2 use an alternative hashing method in which color representations are generated and used. Various perceptual hash algorithms can be used, some of which are available as open source, in Python libraries, in JavaScript libraries, or from other sources. Thus, while a proprietary hashing algorithm may be used, existing perceptual hash algorithms may also be implemented.

When hashes are created, the differences between the hashes may be determined. This may include determining the Hamming distance. In effect, this is a determination of how many bits are different between the hashes. Other suitable methods may also be used. In some cases, quality of a hash may be determined by looking at the separation between positive/negative cases. For instance, EMD distance, intersection-over-union, F1-score, or other measurements may be used.

According to an aspect that may be combined with any one or more other aspects herein, plotting sensor data includes generating a 2-D, non-dimensional plot.

According to an aspect that may be combined with any one or more other aspects herein, plotting the sensor data includes generating a Poincaré plot.

According to an aspect that may be combined with any one or more other aspects herein, a plot generated by plotting the data approximately sketches an attractor of the non-linear dynamic process over a period of time during which the sensor data was obtained.

According to an aspect that may be combined with any one or more other aspects herein, plotting sensor data includes plotting the sensor data over a period of time that is less than or equal to 1 second, 2 seconds, 5 seconds, or 10 seconds.

According to an aspect that may be combined with any one or more other aspects herein, using the one or more sensors includes using a distributed acoustic sensor to obtain strain or vibration data from the non-linear dynamic system.

According to an aspect that may be combined with any one or more other aspects herein, a sensor is a fiber optic sensor.

According to an aspect that may be combined with any one or more other aspects herein, creating one or more perceptual hashes includes creating an average hash, a difference hash, a wavelet hash, a DCT hash, hashes of differing grid size or shapes, or a combination thereof.

According to an aspect that may be combined with any one or more other aspects herein, creating the one or more perceptual hashes includes creating at least two different types of perceptual hashes.

According to an aspect that may be combined with any one or more other aspects herein, comparing one or more perceptual hashes to a set of reference perceptual hashes includes comparing a composite of at least two perceptual hashes to a composite of at least two reference perceptual hashes.

According to an aspect that may be combined with any one or more other aspects herein, comparing one or more perceptual hashes to a set of references perceptual hashes includes calculating a Hamming distance.

According to an aspect that may be combined with any one or more other aspects herein, creating one or more perceptual hashes from plotted sensor data includes defining a grid over the plot. The grid can have a regular spacing or an irregular spacing.

According to an aspect that may be combined with any one or more other aspects herein, identifying one or more matching reference data sets includes identifying a plurality of matching reference data sets.

According to an aspect that may be combined with any one or more other aspects herein, for each matching reference data set, one or more additional perceptual hashes from the plotted sensor data are compared to one or more additional reference perceptual hashes to identifying a higher likelihood matching reference data set.

According to an aspect that may be combined with any one or more other aspects herein, creating one or more perceptual hashes from plotted sensor data includes generating a binary number by replacing local values in a grid with a 1 or a 0. The local values can be replaced based on being above an average, below an average, positive, negative, within or outside a defined range, or the like.

According to an aspect that may be combined with any one or more other aspects herein, an image of a matching reference data set is provided.

According to an aspect that may be combined with any one or more other aspects herein, an image of a matching data set includes a video of the non-linear dynamic process during generation of the data used to produce the reference data set.

According to an aspect that may be combined with any one or more other aspects herein, a method is implemented in a downhole tool or pipeline system.

According to an aspect that may be combined with any one or more other aspects herein, generating a plurality of field perceptual hashes includes generating at least a field average hash and a field difference hash, and potentially at least one field average hash and at least two field difference hashes.

According to an aspect that may be combined with any one or more other aspects herein, comparing a plurality of field perceptual hashes to a plurality of reference hash sets includes comparing a composite hash produced from at least a field average hash and one or more field difference hashes to composite hashes from at least a reference average hash and at one or more reference difference hashes of a plurality of reference data sets.

According to an aspect that may be combined with any one or more other aspects herein, identifying the at least one matching reference data set includes identifying a best matching reference data set, identifying a plurality of best matching reference data sets, or identifying a plurality of reference data sets that exceed a threshold matching value. A best matching reference data set may be a data set having a highest similarity, lowest Hamming distance, or the like.

According to an aspect that may be combined with any one or more other aspects herein, a threshold matching value is at least 0.5, 0.75, 0.8, 0.85, 0.9, 0.91, 0.92, 0.93, or 0.95.

According to an aspect that may be combined with any one or more other aspects herein, an envelope of experimental conditions is define based on a plurality of reference data sets.

According to an aspect that may be combined with any one or more other aspects herein, an envelope of experimental conditions is narrowed by comparing one or more additional field perceptual hashes to one or more reference hash sets.

According to an aspect that may be combined with any one or more other aspects herein, an additional measurement type is determined as it would provide discrimination to narrow the envelope.

According to an aspect that may be combined with any one or more other aspects herein, an alert is raised when one or more field perceptual hashes do not match an expected set of hashes from one or more envelope reference data sets of a plurality of reference data sets.

According to an aspect that may be combined with any one or more other aspects herein, an identified matching reference data set is used to calibrate one or more sensors.

According to an aspect that may be combined with any one or more other aspects herein, one or more sensors including at least two sensors.

According to an aspect that may be combined with any one or more other aspects herein, it is determined whether perceptual field hashes generated from data from sensors maintain an expected pattern over time.

According to an aspect that may be combined with any one or more other aspects herein, a matching reference data set of a plurality of reference data sets is used to identify a low order dynamical model exhibiting same flow characteristics.

According to an aspect that may be combined with any one or more other aspects herein, a dynamic system includes one or more sensors (e.g., fiber optic or acoustic sensors), one or more processors, and one or more computer-readable media including computer-executable instructions that, when executed by the one or more processors, causes the system to obtain sensor data from the one or more sensors, plot the sensor data, create one or more perceptual hashes from the plot of the sensor data, and compare the one or more perceptual hashes to a set of reference perceptual hashes and responsively determine a type of fluid flow within the dynamic system.

According to an aspect that may be combined with any one or more other aspects herein, creating one or more perceptual hashes includes defining a grid for a 2-D non-dimensional plot, constructing a histogram of the 2-D non-dimensional plot on the grid, generating a value in each cell of the grid based on the histogram, and using the values to create the one or more perceptual hashes. The one or more values may include (i) values corresponding to cells in the grid or (ii) differences between values corresponding to adjacent cells in the grid.

According to an aspect that may be combined with any one or more other aspects herein, computer-readable storage media stores computer-executable instructions that, when executed by the one or more processors, cause a computing system or processor to perform a method for determining a condition of a non-linear dynamic process.

According to an aspect that may be combined with any one or more other aspects herein, a system includes one or more processors and one or more computer-readable media having computer-executable instructions that, when executed by the one or more processors, cause the system to perform a method for determining a condition of a non-linear dynamic process.

As a reference, the terms "couple," "coupled," "connect," "connection," "connected," "in connection with," and "connecting" refer to "in direct connection with" or "in connection with via one or more intermediate elements or members." In the claims, means-plus-function clauses are intended to cover the structures described herein as performing the recited function and not merely structural equivalents, but also equivalent structures. It is the express intention of the applicant not to invoke functional claiming for any limitations of any of the claims herein, except for those in which the claim expressly uses the words "means for" or "step for" together with an associated function.

Although a few example embodiments have been described in detail above, those skilled in the art will readily appreciate that many modifications are possible in the example embodiments without materially departing from the scope of the present disclosure. Accordingly, any such modifications are intended to be included within the scope of this disclosure.

What is claimed is:

1. A method for identifying a condition of a non-linear dynamic system, comprising:
   obtaining sensor data from the non-linear dynamic system;
   plotting the sensor data;
   creating one or more perceptual hashes from the plotted sensor data, wherein creating the one or more perceptual hashes from the plotted sensor data includes generating a binary number by replacing local values in a grid with a 1 or 0 based on such local values being at least one of:
      above an average;
      below an average positive; or
      negative;
   comparing the one or more perceptual hashes to a set of reference perceptual hashes and thereby identifying one or more matching reference data sets; and
   providing information on the one or more matching reference data sets.

2. The method of claim 1, wherein plotting the sensor data includes generating a Poincaré plot.

3. The method of claim 1, wherein plotting the sensor data includes plotting the sensor data over a period of time that is less than 1 second, less than 2 seconds, less than 5 seconds, less than 10 seconds, less than 20 seconds, or less than 60 seconds.

4. The method of claim 1, wherein using the one or more sensors includes using a distributed acoustic sensor to obtain strain or vibration data from the non-linear dynamic system.

5. The method of claim 1, wherein creating the one or more perceptual hashes includes creating at least one of an average hash, a difference hash, a wavelet hash, or a DCT hash.

6. The method of claim 5, wherein creating the one or more perceptual hashes includes creating at least two different types of perceptual hashes.

7. The method of claim 5, wherein comparing the one or more perceptual hashes to the set of reference perceptual hashes includes comparing a composite of at least two perceptual hashes to a composite of at least two reference perceptual hashes.

8. The method of claim 1, wherein comparing the one or more perceptual hashes to the set of references perceptual hashes includes calculating a Hamming distance.

9. The method of claim 1, wherein creating the one or more perceptual hashes from the plotted sensor data includes defining a grid over the plot.

10. The method of claim 9, wherein the grid has a regular spacing.

11. The method of claim 1, wherein identifying the one or more matching reference data sets includes identifying a plurality of matching reference data sets, the method further comprising:
   for each matching reference data set, comparing one or more additional perceptual hashes from the plotted sensor data to one or more additional reference perceptual hashes to identify a higher likelihood matching reference data set.

12. A method for determining a condition of a dynamic system, comprising:
   receiving strain or vibration sensor data on a conduit having fluid flow therein;
   generating a plot for the received sensor data;
   generating at least one perceptual hash from the plot of the received sensor data;
   accessing a data store having a plurality of reference hashes corresponding to a plurality of reference data sets; and
   comparing the at least one perceptual hash to the plurality of reference hashes and, in response, identifying at least one matching reference data set of the plurality of reference data sets, wherein identifying the at least one matching reference data set includes identifying a best matching reference data set, identifying a plurality of reference data sets having a best matching value, or identifying a plurality of reference data sets that exceed a threshold matching value of at least 0.8, 0.85, 0.9, 0.91, or 0.92.

13. The method of claim 12, further comprising:
   defining an envelope of experimental conditions based on the plurality of reference data sets; and at least one of:

narrowing the envelope by comparing one or more additional perceptual hashes to the plurality of reference hashes; or determining an additional measurement type that would provide discrimination narrowing the envelope.

14. The method of claim 12, further comprising at least one of:

raising an alert when the at least one perceptual hash does not match an expected set of hashes from one or more envelope reference data sets of the plurality of reference data sets; or using the identified at least one matching reference data set to calibrate the one or more sensors.

15. The method of claim 12, the one or more sensors including at least two sensors and the at least one perceptual hash includes a plurality of field perceptual hashes, the method further comprising:

evaluating whether the plurality of field perceptual hashes generated from data from the at least two sensors maintain an expected pattern.

16. A dynamic system, comprising:

one or more fiber optic or acoustic sensors;

one or more processors; and one or more computer-readable media including computer-executable instructions that, when executed by the one or more processors, causes the system to:

obtain sensor data from one or more sensors;

plot the sensor data;

create one or more perceptual hashes from the plot of the sensor data, wherein creating the one or more perceptual hashes includes:

defining a grid for a 2-D non-dimensional plot;

constructing a histogram of the 2-D non-dimensional plot on the grid;

generating a value in each cell of the grid based on the histogram; and using at least one of values corresponding to cells in the grid, or differences between values corresponding to adjacent cells, in creating the one or more perceptual hashes; and compare the one or more perceptual hashes to a set of reference perceptual hashes and, in response, determine a type of fluid flow within the dynamic system.

* * * * *